US011009868B2

(12) United States Patent
Ferguson et al.

(10) Patent No.: US 11,009,868 B2
(45) Date of Patent: May 18, 2021

(54) FLEET OF AUTONOMOUS VEHICLES WITH LANE POSITIONING AND PLATOONING BEHAVIORS

(71) Applicant: Nuro, Inc., Mountain View, CA (US)

(72) Inventors: David Ferguson, San Francisco, CA (US); Jiajun Zhu, Palo Alto, CA (US); Russell Smith, Los Altos, CA (US)

(73) Assignee: Nuro, Inc., Mountain View, CA (US)

( * ) Notice: Subject to any disclaimer, the term of this patent is extended or adjusted under 35 U.S.C. 154(b) by 351 days.

(21) Appl. No.: 16/040,418

(22) Filed: Jul. 19, 2018

(65) Prior Publication Data

US 2019/0025819 A1 Jan. 24, 2019

Related U.S. Application Data

(60) Provisional application No. 62/535,118, filed on Jul. 20, 2017.

(51) Int. Cl.
| | | |
|---|---|---|
| *G05D 1/00* | (2006.01) | |
| *G08G 1/00* | (2006.01) | |
| *G06K 9/00* | (2006.01) | |
| *B60W 30/12* | (2020.01) | |
| *G08G 1/16* | (2006.01) | |

(Continued)

(52) U.S. Cl.
CPC ........... *G05D 1/0027* (2013.01); *B60W 30/12* (2013.01); *G05D 1/0088* (2013.01); *G05D 1/0293* (2013.01); *G06K 9/00805* (2013.01); *G08G 1/0112* (2013.01); *G08G 1/0133* (2013.01); *G08G 1/0145* (2013.01); *G08G 1/164* (2013.01); *G08G 1/167* (2013.01); *G08G 1/22* (2013.01); *B60W 2554/00* (2020.02); *B60W 2555/20* (2020.02); *G05D 2201/0212* (2013.01); *G06K 9/00798* (2013.01)

(58) Field of Classification Search
CPC .. G05D 1/0027; G05D 1/0293; G05D 1/0088; G05D 2201/0212; G08G 1/167; G08G 1/0133; G08G 1/0145; G08G 1/164; G08G 1/0112; G08G 1/22; G06K 9/00805; G06K 9/00798; B60W 30/12; B60W 2554/00; B60W 2555/20
See application file for complete search history.

(56) References Cited

U.S. PATENT DOCUMENTS

| | | |
|---|---|---|
| 3,064,252 A | 11/1962 | Varela |
| 4,766,548 A | 8/1988 | Cedrone et al. |
| 4,952,911 A | 8/1990 | D'Ambrosia et al. |

(Continued)

FOREIGN PATENT DOCUMENTS

| | | |
|---|---|---|
| JP | H036407 A | 1/1991 |
| JP | 2001256576 A | 9/2001 |

(Continued)

OTHER PUBLICATIONS

PCT/US2018/042967 International Search Report and Written Opinion dated Sep. 26, 2018.

(Continued)

*Primary Examiner* — Thomas Ingram

(57) ABSTRACT

Disclosed herein are systems for navigating an autonomous or semi-autonomous fleet comprising a plurality of autonomous or semi-autonomous vehicles within a plurality of navigable pathways within an unstructured open environment.

16 Claims, 13 Drawing Sheets

(51) Int. Cl.
*G08G 1/01* (2006.01)
*G05D 1/02* (2020.01)

(56) References Cited

U.S. PATENT DOCUMENTS

| | | |
|---|---|---|
| 5,128,861 A | 7/1992 | Kagami et al. |
| 5,179,843 A | 1/1993 | Cohausz et al. |
| 5,207,784 A | 5/1993 | Schwartzendruber et al. |
| 5,636,122 A | 6/1997 | Shah et al. |
| 5,844,808 A | 12/1998 | Konsmo et al. |
| 5,877,688 A | 3/1999 | Morinaka et al. |
| D411,814 S | 7/1999 | Chibuka et al. |
| 5,922,040 A | 7/1999 | Prabhakaran et al. |
| 6,021,394 A | 2/2000 | Takahashi et al. |
| 6,034,803 A | 3/2000 | Sullivan et al. |
| 6,181,981 B1 | 1/2001 | Varga et al. |
| 6,230,150 B1 | 5/2001 | Walker et al. |
| 6,323,941 B1 | 11/2001 | Evans et al. |
| 6,571,150 B2 | 5/2003 | Arai et al. |
| 6,609,101 B1 | 8/2003 | Landvater et al. |
| 6,636,598 B1 | 10/2003 | Thomson et al. |
| 7,030,968 B2 | 4/2006 | D'Aligny et al. |
| 7,051,539 B2 | 5/2006 | Junge et al. |
| 7,139,721 B2 | 11/2006 | Borders et al. |
| 7,177,825 B1 | 2/2007 | Borders et al. |
| 7,190,465 B2 | 3/2007 | Froehlich et al. |
| 7,227,116 B2 | 6/2007 | Glecker et al. |
| 7,281,891 B2 | 10/2007 | Smith et al. |
| 7,521,935 B2 | 4/2009 | Uchida et al. |
| 7,534,984 B2 | 5/2009 | Gleckler |
| D615,905 S | 5/2010 | Arnell |
| 7,798,885 B2 | 9/2010 | Wong et al. |
| 7,944,548 B2 | 5/2011 | Eaton |
| 8,072,581 B1 | 12/2011 | Breiholz |
| 8,191,779 B2 | 6/2012 | Illingworth et al. |
| 8,326,707 B2 | 12/2012 | Fan et al. |
| 8,630,897 B1 | 1/2014 | Prada et al. |
| 8,675,184 B2 | 3/2014 | Schmitt et al. |
| 8,788,341 B1 | 7/2014 | Patel et al. |
| 8,836,922 B1 | 9/2014 | Pennecot et al. |
| 8,862,388 B2 | 10/2014 | Wu et al. |
| 8,989,053 B1 | 3/2015 | Skaaksrud et al. |
| D734,211 S | 7/2015 | Ahn et al. |
| 9,086,273 B1 | 7/2015 | Gruver et al. |
| 9,147,192 B2 | 9/2015 | Dawson et al. |
| 9,230,236 B2 | 1/2016 | Villamar et al. |
| 9,256,852 B1 | 2/2016 | Myllymaki |
| 9,307,383 B1 | 4/2016 | Patrick et al. |
| D755,673 S | 5/2016 | Ahn et al. |
| 9,383,753 B1 | 7/2016 | Templeton et al. |
| 9,488,984 B1 | 11/2016 | Williams et al. |
| 9,489,490 B1 | 11/2016 | Theobald et al. |
| 9,552,564 B1 | 1/2017 | Martenis et al. |
| 9,613,346 B2 | 4/2017 | Crow et al. |
| 9,684,914 B1 | 6/2017 | Porter et al. |
| 9,741,010 B1 | 8/2017 | Heinla et al. |
| 9,786,187 B1 | 10/2017 | Bar-Zeev et al. |
| 9,815,633 B1 | 11/2017 | Kisser et al. |
| 9,824,394 B1 | 11/2017 | Boates et al. |
| 9,905,133 B1 | 2/2018 | Kumar et al. |
| 9,916,703 B2 | 3/2018 | Douillard et al. |
| 9,984,525 B2 | 5/2018 | Will et al. |
| 10,029,787 B1 | 7/2018 | Lesser et al. |
| 10,120,384 B2 | 11/2018 | Wilkinson et al. |
| 2002/0023594 A1 | 2/2002 | Greene et al. |
| 2003/0209375 A1 | 11/2003 | Suzuki et al. |
| 2004/0181570 A1 | 9/2004 | Kaneko et al. |
| 2004/0225954 A1 | 11/2004 | Maloney |
| 2005/0043011 A1 | 2/2005 | Murray et al. |
| 2005/0060246 A1 | 3/2005 | Lastinger et al. |
| 2006/0106490 A1 | 5/2006 | Howell et al. |
| 2007/0182818 A1 | 8/2007 | Buehler et al. |
| 2007/0235465 A1 | 10/2007 | Walker et al. |
| 2010/0219953 A1 | 9/2010 | Bloy et al. |
| 2010/0228405 A1 | 9/2010 | Morgal et al. |
| 2010/0234991 A1 | 9/2010 | Zini et al. |
| 2010/0256852 A1* | 10/2010 | Mudalige ............... G08G 1/22 701/24 |
| 2010/0301056 A1 | 12/2010 | Wolfe et al. |
| 2011/0130134 A1 | 6/2011 | Van et al. |
| 2011/0313811 A1 | 12/2011 | Urban et al. |
| 2012/0059729 A1 | 3/2012 | Roa et al. |
| 2012/0078553 A1 | 3/2012 | Kuroda et al. |
| 2012/0173747 A1 | 7/2012 | Roesch et al. |
| 2012/0185130 A1 | 7/2012 | Ekchian et al. |
| 2013/0061044 A1 | 3/2013 | Pinkus et al. |
| 2013/0282472 A1 | 10/2013 | Penilla et al. |
| 2013/0307698 A1 | 11/2013 | Park et al. |
| 2014/0022051 A1 | 1/2014 | Levien et al. |
| 2014/0136414 A1 | 5/2014 | Abhyanker |
| 2014/0209634 A1 | 7/2014 | Metropulos et al. |
| 2014/0316561 A1 | 10/2014 | Tkachenko et al. |
| 2014/0330739 A1 | 11/2014 | Falcone et al. |
| 2014/0344608 A1 | 11/2014 | Wang et al. |
| 2014/0358353 A1 | 12/2014 | Ibanez-Guzman et al. |
| 2014/0380264 A1 | 12/2014 | Misra et al. |
| 2015/0006005 A1* | 1/2015 | Yu ....................... G06Q 50/28 701/22 |
| 2015/0120094 A1 | 4/2015 | Kimchi et al. |
| 2015/0134546 A1 | 5/2015 | Penilla et al. |
| 2015/0149015 A1 | 5/2015 | Nakano et al. |
| 2015/0154538 A1 | 6/2015 | Skaaksrud et al. |
| 2015/0170099 A1 | 6/2015 | Beach-Drummond et al. |
| 2015/0348112 A1 | 12/2015 | Ramanujam et al. |
| 2016/0018224 A1 | 1/2016 | Isler et al. |
| 2016/0033966 A1 | 2/2016 | Farris et al. |
| 2016/0062583 A1 | 3/2016 | Ricci |
| 2016/0071052 A1 | 3/2016 | Henry et al. |
| 2016/0098871 A1 | 4/2016 | Oz et al. |
| 2016/0247109 A1 | 8/2016 | Scicluna et al. |
| 2016/0286627 A1 | 9/2016 | Chen et al. |
| 2016/0300187 A1 | 10/2016 | Kashi et al. |
| 2016/0334797 A1 | 11/2016 | Ross et al. |
| 2016/0357187 A1 | 12/2016 | Ansari |
| 2016/0357188 A1 | 12/2016 | Ansari et al. |
| 2016/0358477 A1 | 12/2016 | Ansari et al. |
| 2016/0363991 A1 | 12/2016 | Schlecht et al. |
| 2017/0011580 A1 | 1/2017 | Huang et al. |
| 2017/0057516 A1 | 3/2017 | Gordon et al. |
| 2017/0075355 A1 | 3/2017 | Micks et al. |
| 2017/0090480 A1 | 3/2017 | Ho et al. |
| 2017/0115125 A1 | 4/2017 | Outwater et al. |
| 2017/0124547 A1 | 5/2017 | Natarajan et al. |
| 2017/0124781 A1 | 5/2017 | Douillard et al. |
| 2017/0132934 A1* | 5/2017 | Kentley ............... G08G 1/202 |
| 2017/0132960 A1 | 5/2017 | Kis-Benedek et al. |
| 2017/0153714 A1 | 6/2017 | Gao et al. |
| 2017/0193434 A1 | 7/2017 | Shah et al. |
| 2017/0227962 A1 | 8/2017 | Cesarano et al. |
| 2017/0248964 A1 | 8/2017 | Kentley et al. |
| 2017/0255198 A1 | 9/2017 | Rodriguez et al. |
| 2017/0261977 A1 | 9/2017 | High et al. |
| 2017/0262790 A1 | 9/2017 | Khasis |
| 2017/0282859 A1 | 10/2017 | Grimm et al. |
| 2017/0293296 A1* | 10/2017 | Stenneth ............... G06Q 20/10 |
| 2017/0313421 A1 | 11/2017 | Gil et al. |
| 2017/0323253 A1 | 11/2017 | Enssle et al. |
| 2018/0024554 A1 | 1/2018 | Brady et al. |
| 2018/0025635 A1 | 1/2018 | Cheaz et al. |
| 2018/0033308 A1 | 2/2018 | Litkouhi et al. |
| 2018/0053147 A1 | 2/2018 | Zhang et al. |
| 2018/0053369 A1 | 2/2018 | High et al. |
| 2018/0053423 A1 | 2/2018 | Dacosta et al. |
| 2018/0068253 A1 | 3/2018 | Simms et al. |
| 2018/0082343 A1 | 3/2018 | Gordon et al. |
| 2018/0099602 A1 | 4/2018 | Salter et al. |
| 2018/0101818 A1 | 4/2018 | Simms et al. |
| 2018/0134200 A1 | 5/2018 | Wilkinson et al. |
| 2018/0144300 A1 | 5/2018 | Wiechers et al. |
| 2018/0157984 A1 | 6/2018 | O'Herlihy et al. |
| 2018/0158018 A1 | 6/2018 | Luckay et al. |
| 2018/0165728 A1 | 6/2018 | McDonald et al. |
| 2018/0189716 A1 | 7/2018 | Crone et al. |
| 2018/0194411 A1 | 7/2018 | Liivik et al. |

(56) References Cited

U.S. PATENT DOCUMENTS

| | | |
|---|---|---|
| 2018/0196416 A1 | 7/2018 | Iagnemma et al. |
| 2018/0196417 A1 | 7/2018 | Iagnemma et al. |
| 2018/0211541 A1 | 7/2018 | Rakah et al. |
| 2018/0232839 A1 | 8/2018 | Heinla et al. |
| 2018/0246526 A1 | 8/2018 | Wilkinson et al. |
| 2018/0253108 A1 | 9/2018 | Heinla et al. |
| 2018/0260778 A1 | 9/2018 | Mazetti et al. |
| 2018/0260780 A1 | 9/2018 | Mazetti et al. |
| 2018/0330313 A1 | 11/2018 | Clarke et al. |
| 2018/0349872 A1 | 12/2018 | Ahmed et al. |
| 2018/0373246 A1 | 12/2018 | Laughlin et al. |
| 2018/0374002 A1 | 12/2018 | Li et al. |
| 2019/0023236 A1 | 1/2019 | Webb et al. |

FOREIGN PATENT DOCUMENTS

| | | |
|---|---|---|
| JP | 2006177843 A | 7/2006 |
| WO | WO-2013025803 A1 | 2/2013 |
| WO | WO-2017014544 A1 | 1/2017 |
| WO | WO-2017064202 A1 | 4/2017 |
| WO | WO-2019018695 A1 | 1/2019 |
| WO | WO-2019023518 A1 | 1/2019 |
| WO | WO-2019023519 A1 | 1/2019 |
| WO | WO-2019023521 A1 | 1/2019 |
| WO | WO-2019023522 A1 | 1/2019 |
| WO | WO-2019023615 A1 | 1/2019 |
| WO | WO-2019023686 A1 | 1/2019 |

OTHER PUBLICATIONS

PCT/US2018/043987 International Search Report and Written Opinion dated Oct. 2, 2018.
PCT/US2018/043989 International Search Report and Written Opinion dated Oct. 5, 2018.
PCT/US2018/043990 International Search Report and Written Opinion dated Oct. 5, 2018.
U.S. Appl. No. 16/040,446 Office Action dated Oct. 17, 2018.
Co-pending U.S. Appl. No. 16/119,939, filed Aug. 31, 2018.
PCT/US2018/043986 International Search Report and Written Opinion dated Oct. 23, 2018.
PCT/US2018/044155 International Search Report and Written Opinion dated Oct. 15, 2018.
PCT/US2018/044248 International Search Report and Written Opinion dated Oct. 24, 2018.
U.S. Appl. No. 16/048,124 Office Action dated Nov. 1, 2018.
Curtis et al., Skype founders invent self-driving robot that can deliver groceries for L1. London Telegraph (3 pgs) (2015).
Emerging Tech. Domino's has built a self-driving pizza delivery robot. Available at https://www.digitaltrends.com/cool-tech/dominos-pizza-delivery-robot/ (12 pgs) (2016).
Navarro et al. A mobile robot vending machine for beaches based on customer's preferences and multivariate methods. Procedia—Social and Behavioral Sciences 175:122-129 (2015).
Olson . Self-Driving Robots Will Start Delivering Food for Just Eat and Others. Available at https://www.forbes.com/sites/parmyolson/2016/07/05/self-driving-robots-food-delivery-just-eat/#6e3e834b280d (3 pgs) (2016).
Peters. The Grocery Store, of the Future is Mobile, Self-Driving and Run by AI. Fast Company (6 pgs.) (Jun. 13, 2017).
Pettitt. Forget delivery drones, meet your new delivery robot. Available at https://www.cnbc.com/2015/11/02/forget-delivery-drones-meet-your-new-delivery-robot.html (5 pgs) (2015).
Ratkov. Robotic Vending Machines Anthonyratkkov.com/robotics/robotic vending machines (2 pgs.) (2010).
U.S. Appl. No. 16/046,954 Office Action dated Nov. 29, 2018.
U.S. Appl. No. 16/046,967 Office Action dated Dec. 4, 2018.
U.S. Appl. No. 16/046,978 Office Action dated Feb. 28, 2019.
U.S. Appl. No. 16/046,980 Office Action dated Feb. 27, 2019.
U.S. Appl. No. 16/047,901 Office Action dated Dec. 11, 2018.
Westaway. Meet the robot built to deliver your shopping. Starship Technologies' "local delivery robot" is semi-autonomous, covered in cameras and ready to bring food to your door. Available at https://www.cnet.com/news/meet-the-robot-thats-built-to-deliver-your-shopping/ (4 pgs.) (2016).
American National Standard for Safe Use of Lasers. ANSI ZI136. 1-2000 (§4.5.1.5; 4.5.1.3-4 and p. 5) (19 pgs) (2000).
AN/TPS-43 Radar System Westinghouse. Westinghouse (pp. 3, 4, 6, 9 & 14) (14 pgs) (2007).
Chen et al. 3d object proposals for accurate object class detection. In Advances in Neural Information Processing Systems, pp. 424-432 (2015).
Chen et al. Monocular 3d object detection for autonomous driving. In Proceedings of the IEEE Conference on Computer Vision and Pattern Recognition, pp. 2147-2156 (2016).
Chen et al. Multi-view 3d object detection network for autonomous driving. In IEEE CVPR, pp. 1907-1915 (2017).
Co-pending U.S. Appl. No. 16/040,432, filed Jul. 19, 2018.
Co-pending U.S. Appl. No. 16/040,437, filed Jul. 19, 2018.
Co-pending U.S. Appl. No. 16/040,446, filed Jul. 19, 2018.
Co-pending U.S. Appl. No. 16/046,954, filed Jul. 26, 2018.
Co-pending U.S. Appl. No. 16/046,967, filed Jul. 26, 2018.
Co-pending U.S. Appl. No. 16/046,978, filed Jul. 26, 2018.
Co-pending U.S. Appl. No. 16/046,980, filed Jul. 26, 2018.
Co-pending U.S. Appl. No. 16/047,901, filed Jul. 27, 2018.
Co-pending U.S. Appl. No. 16/048,124, filed Jul. 27, 2018.
Deng et al. Amodal detection of 3d objects: Inferring 3d bounding boxes from 2d ones in rgb-depth images. In Conference on Computer Vision and Pattern Recognition (CVPR), INSPEC Accession No. 17355643 (2017).
Engelcke et al. Vote3deep: Fast object detection in 3d point clouds using efficient convolutional neural networks. In Robotics and Automation (ICRA), 2017 IEEE International Conference on, pp. 1355-1361 (2017).
Food and Drugs Rule—Performance Standards for Light-Emitting Products 21 C.F.R. § 1040.10 (19 pgs) (2005).
Fox. Volume 6: Active Electro-Optical Systems. The Infrared & Electro-Optical Systems Handbook. (326 pgs) (1993).
Geiger et al. Vision meets robotics: The KITTI dataset. The International Journal of Robotics Research 32(11):1231-1237 (2013).
Girshick et al. Rich feature hierarchies for accurate object detection and semantic segmentation. In Computer Vision and Pattern Recognition (CVPR) 2014 IEEE Conference on, pp. 580-587 (2014).
Gustavson. Diode-laser radar for low cost weapon guidance. SPIE 1633(VII):21-32 (pp. 21, 27, 28, 31 & Fig. 3.3-1) (1992).
Kawata et al. Development of ultra-small lightweight optical range sensor systems. 2005 IEEE/RSJ International Conference on Intelligent Robots and Systems. INSPEC Accession No. 8750287. (6 pgs) (Aug. 2-6, 2005).
Kilpela. Precise pulsed time-of-flight laser range finder for industrial distance measurements. Review of Scientific Instruments 72:2197 (Apr. 2001).
Lahoud et al. 2d-driven 3d object detection in rgb-d images. In Proceedings of the IEEE Conference on Computer Vision and Pattern Recognition, pp. 4622-4630 (2017).
Liu et al. SSD: Single shot multibox detector. In European conference on computer vision, pp. 21-37. Springer (2016).
Maturana et al. Voxnet: A 3d convolutional neural network for real-time object recognition. In IEEE/RSJ International Conference on Intelligent Robots and Systems (7 pgs) (Sep. 2015).
Mousavian et al. 3d bounding box estimation using deep learning and geometry. In Computer Vision and Pattern Recognition (CVPR), pp. 7074-7082 (2016).
Qi et al. Pointnet++: Deep hierarchical feature learning on point sets in a metric space. NIPS (14 pgs) (2017).
Qi et al. Frustum PointNets for 3D Object Detection from RGB-D Data. In Computer Vision and Pattern Recognition (CVPR), pp. 918-927 (Apr. 2018).
Qi et al. Pointnet: Deep learning on point sets for 3d classification and segmentation. Proc. Computer Vision and Pattern Recognition (CVPR), pp. 652-660 (2017).

(56) References Cited

OTHER PUBLICATIONS

Qi et al. Volumetric and multi-view cnns for object classification on 3d data. In Proceedings Computer Vision and Pattern Recognition (CVPR), pp. 5648-5656 (2016).
Ren et al. Accurate single stage detector using recurrent rolling convolution. In Computer Vision and Pattern Recognition (CVPR), pp. 5420-5428 (2017).
Ren et al. Faster r-cnn: Towards real-time object detection with region proposal networks. In Advances in neural information processing systems, pp. 91-99 (2015).
Ren et al. Three-dimensional object detection and layout prediction using clouds of oriented gradients. In Proceedings of the IEEE Conference on Computer Vision and Pattern Recognition, pp. 1525-1533 (2016).
Richmond et al. Polarimetric Imaging Laser Radar (PILAR) Program. In Advanced Sensory Payloads for UAV. Meeting Proceedings RTO-MP-SET-092, Paper 19. Neuilly-sur-Sein, France: RTO (35 pgs) (May 1, 2005).
Riegler et al. Octnet: Learning deep 3d representations at high resolutions. In Computer Vision and Pattern Recognition (CVPR), pp. 3577-3586 (2016).
Skolnik. Introduction to Radar Systems Handbook. McGraw-Hill Book Company. (590 pgs)(2d ed. 1980).
Skolnik. Radar Handbook. McGraw-Hill Book Company (1.18, 20.6 & 20.7-8) (846 pgs)(2d ed. 1990).
Song et al. Deep sliding shapes for amodal 3d object detection in rgb-d images. In Proceedings of the IEEE Conference on Computer Vision and Pattern Recognition, pp. 808-816 (2016).
Song et al. Sliding shapes for 3d object detection in depth images. In Computer Vision-ECCV 2014, pp. 634-651 (2014).
Song et al. Sun rgb-d: A rgb-d scene understanding benchmark suite. In Proceedings of the IEEE Conference on Computer Vision and Pattern Recognition, pp. 567-576 (2015).
Su et al. Multi-view convolutional neural networks for 3d shape recognition. In Proceedings of the IEEE Conference on Computer Vision and Pattern Recognition, pp. 945-953 (2015).
Wang et al. O-cnn: Octree-based convolutional neural networks for 3d shape analysis. ACM Transactions on Graphics (TOG) 36(4):72 (2017).
Wu et al. 3d shapenets: A deep representation for volumetric shapes. In Proceedings of the IEEE Conference on Computer Vision and Pattern Recognition, pp. 1912-1920 (2015).
Xiang et al. Data-driven 3d voxel patterns for object category recognition. In Proceedings of the IEEE Conference on Computer Vision and Pattern Recognition, pp. 1903-1911 (2015).
Yu et al. Vehicle detection and localization on birds eye view elevation images using convolutional neural network. 2017 IEEE International Symposium on Safety, Security and Res-cue Robotics (SSRR) INSPEC Accession No. 17315970 (2017).
Qi et al. Frustum PointNets for 3D Object Detection from RGB-D Data. Available from https://arxiv.org/pdf/1711.08488v1.pdf (15 pgs.) (Nov. 2017).

* cited by examiner

FLEET OF AUTONOMOUS VEHICLES WITH LANE POSITIONING AND PLATOONING BEHAVIORS

CROSS-REFERENCE

This application claims the benefit of U.S. Provisional Application No. 62/535,118, filed Jul. 20, 2017, which application is incorporated herein by reference.

BACKGROUND OF THE INVENTION

The field of autonomous and semi-autonomous vehicles is a growing field of innovation. Vehicles are being used for many purposes including warehouse inventory operations, household vacuuming vehicles, hospital delivery vehicles, sanitation vehicles and military or defense applications.

SUMMARY OF THE INVENTION

This disclosure relates to a fleet comprising a plurality of vehicles operating autonomously and/or and semi-autonomously and a fleet management module for coordination of the fleet, each vehicle configured for safe, open-road travel in an unstructured open environment and further configured to utilize lane positioning and platooning to optimize safety and efficiency.

Provided herein is an system for navigation within a plurality of navigable pathways within an unstructured open environment, the system comprising: a server processor configured to provide a fleet management module application; an autonomous or semi-autonomous fleet comprising a plurality of autonomous or semi-autonomous vehicles, each autonomous or semi-autonomous vehicle comprising: a sensor system comprising a plurality of sensors configured to measure a sensed data; a location sensor configured to measure a locational data; a communication device configured to receive a fleet instruction from the fleet management module application, and to transmit at least one of the sensed data and the location data to the fleet management module application; and an autonomous or semi-autonomous propulsion system; and the system further comprising a non-transitory computer-readable storage media encoded with a computer program including instructions executable by a processor to create an application comprising: a database comprising a map of the plurality of navigable pathways within the unstructured open environment; a lane position detection module determining a boundary of the navigable pathway based at least on the sensed data; a location detection module determining a position of the autonomous or semi-autonomous vehicle based at least on one or more of the map, the locational data, and the sensed data; and a navigation module commanding the autonomous or semi-autonomous propulsion system to navigate within the plurality of navigable pathways based at least on one or more of the boundary of the navigable pathway, the position of the autonomous or semi-autonomous vehicle, the sensed data, and the fleet instruction.

In some embodiments, at least one of the plurality of autonomous or semi-autonomous vehicles in the autonomous or semi-autonomous fleet comprises a lead autonomous or semi-autonomous vehicle. In some embodiments, the application further comprises a lead position detection module determining a position, a velocity, or both, of the lead autonomous or semi-autonomous vehicle, based at least on one or more of the sensed data and the fleet instruction. In some embodiments, the application further comprises a platooning module determining a drafting proximity adjustment based at least on the position, the velocity, or both, of the lead autonomous or semi-autonomous vehicle. In some embodiments, the navigation module further commands the autonomous or semi-autonomous propulsion system based on the drafting proximity adjustment. In some embodiments, the navigation module commands the autonomous or semi-autonomous propulsion system based on the drafting proximity adjustment when the drafting proximity adjustment is within a set threshold. In some embodiments, the application further comprises a driving safety module detecting a hazard based at least on the sensed data, wherein the hazard comprises at least one of a weather condition, a manned vehicle position, and an obstacle. In some embodiments, the driving safety module further determines a corrective maneuver based on the hazard. In some embodiments, the navigation module further commands the autonomous or semi-autonomous propulsion system based on the corrective maneuver. In some embodiments, the boundary of the navigable pathway comprises a left boundary and a right boundary, and wherein the navigation module commands the autonomous or semi-autonomous propulsion system to navigate between the left boundary and the right boundary. In some embodiments, each of the autonomous or semi-autonomous vehicles further comprises an energy storage device configured to provide a power to at least one of the sensor system, the location sensor, the communication device, and the autonomous or semi-autonomous propulsion system. In some embodiments, the lane position detection module and the location detection module determine in parallel. In some embodiments, the location detection module confirms the position of the autonomous or semi-autonomous vehicle based on the boundary of the navigable pathway and the map.

Also provided herein is an system for navigation within a plurality of navigable pathways within an unstructured open environment, the system comprising: a server processor configured to provide a fleet management module application; an autonomous or semi-autonomous fleet comprising a plurality of autonomous or semi-autonomous vehicles, wherein at least one of the plurality of autonomous or semi-autonomous vehicles comprises a lead autonomous or semi-autonomous vehicle; and wherein each autonomous or semi-autonomous vehicle comprises: a sensor system comprising a plurality of sensors configured to measure a sensed data; communication device configured to receive a fleet instruction from the fleet management module application, and to transmit the sensed data to the fleet management module application; an autonomous or semi-autonomous propulsion system; and a location sensor configured to measure a locational data; and the system further comprising a non-transitory computer-readable storage media encoded with a computer program including instructions executable by a processor to create an application comprising: a lead position detection module determining a position, a velocity, or both of the lead autonomous or semi-autonomous vehicle based at least on one or more of the sensed data and the fleet instruction; and a navigation module commanding the autonomous or semi-autonomous propulsion system to navigate within the plurality of navigable pathways based at least on one or more of the position of the lead autonomous or semi-autonomous vehicle, the velocity of the lead autonomous or semi-autonomous vehicle, the sensed data, and the fleet instruction.

In some embodiments, the application further comprises a platooning module determining a drafting proximity adjustment based at least on the position, the velocity, or both, of the lead autonomous or semi-autonomous vehicle. In some embodiments, the navigation module further commands the autonomous or semi-autonomous propulsion system based on the drafting proximity adjustment. In some embodiments, the navigation module commands the autonomous or semi-autonomous propulsion system based on the drafting proximity adjustment when the drafting proximity adjustment is within a set threshold. In some embodiments, the application further comprises a driving safety module detecting a hazard based at least on the sensed data, wherein the hazard comprises at least one of a weather condition, a manned vehicle position, and an obstacle. In some embodiments, the driving safety module further determines a corrective maneuver based on the hazard. In some embodiments, the navigation module further commands the autonomous or semi-autonomous propulsion system based on the corrective maneuver.

Provided herein is a fleet comprising a plurality of vehicle vehicles operating autonomously and/or and semi-autonomously and a fleet management module (associated with a central server) for coordination of the fleet, each vehicle configured for safe, open-road travel in an unstructured open environment and further configured to utilize lane positioning and platooning to optimize safety and efficiency. Each vehicle comprises, a propulsion system, a navigation module, a sensor system comprising a plurality of sensors, multiple software modules, at least one communication module and at least one processor configured to manage the propulsion system, the navigation module, the software modules and the at least one communication module.

Provided herein is a fleet, comprising: a plurality of vehicles operating autonomously; and a fleet management module for coordination of the fleet; wherein the fleet management module is configured to coordinate the activity, location, and positioning of each vehicle in the fleet; wherein the fleet is configured for safe, open-road travel in an unstructured open environment; and wherein each vehicle in the fleet comprises: a propulsion system; a navigation module for navigation in the unstructured open environment; at least one communication module adapted to receive, store, and send data to a user and other vehicles in the fleet, between the vehicles of the fleet and between the user and other vehicles in the fleet, related to at least, the conditions in the environment around the vehicle and the fleet interactions; a sensor system comprising a plurality of sensors configured to assess the environment around the vehicle; at least one processor configured to manage the propulsion system, the navigation module, and the at least one communication module; a first software module, executed by the at least one processor, to apply one or more algorithms to data from the plurality of sensors to manage lane positioning of the autonomous or semi-autonomous vehicle by determining the edges or boundaries of a navigable pathway and position the autonomous or semi-autonomous vehicle within a specified distance from one or more of said edges or boundaries; and an optional second software module, executed by the at least one processor, to apply one or more algorithms to data from the navigation module, acting in parallel to the first software module to manage lane positioning of the autonomous or semi-autonomous vehicle in the unstructured open environment by confirming the position of the vehicle relative to a known map and geo-positioning provided by the navigation module. Additionally, the first software module, executed by the at least one processor, may apply one or more algorithms to data acquired from internal maps, combined with data from the plurality of sensors to manage lane positioning.

Provided herein is a fleet, comprising: a plurality of vehicles operating autonomously; and a fleet management module for coordination of the fleet; wherein the fleet management module is configured to coordinate the activity, location, and positioning of each vehicles in the fleet; wherein the fleet is configured for safe, open-road travel in an unstructured open environment; and wherein each vehicles in the fleet comprises: a propulsion system; a navigation module for navigation in the unstructured open environment; at least one communication module configured to transmit data from each vehicles to at least one of; the fleet management module, a user, and other vehicles; and to receive instructions from the fleet management module or a user; a sensor system comprising a plurality of sensors configured to assess the environment around the vehicles; at least one processor configured to manage the propulsion system, the navigation module, and the at least one communication module; and a third software module, executed by the at least one processor, to apply one or more algorithms to data collected from the plurality of sensors to identify, and adjust for one or more of: a speed of a lead vehicle, a distance apart from a lead vehicle, a lateral position of a lead vehicle or (non-fleet) lead vehicle within the roadway, road conditions, detected obstacles above, below or on either side of the lead vehicle, traffic congestion, and weather conditions.

Provided herein is a fleet, comprising: a plurality of vehicles operating autonomously; and a fleet management module for coordination of the fleet; wherein the fleet management module is configured to coordinate the activity, location, and positioning of each vehicle in the fleet; wherein the fleet is configured for safe, open-road travel in an unstructured open environment; and wherein each vehicle in the fleet comprises: a propulsion system; a power system, a navigation module for navigation in the unstructured open environment; at least one communication module configured to receive, store, and send data to a fleet management module, a user and other vehicles in the fleet, between the vehicles of the fleet and between the user and other vehicles in the fleet, related to at least, the conditions in the environment around the vehicle and the fleet interactions; a sensor system comprising a plurality of sensors configured to assess the environment around the vehicle; at least one processor configured to manage the propulsion system, the power system, the navigation module, and the at least one communication module; and a third software module, executed by the at least one processor, to apply one or more algorithms to data collected from the plurality of sensors to identify, document, and adjust for one or more of: speed of a lead vehicle, distance apart from a lead vehicle, road conditions, detected obstacles above, below or on either side of the lead vehicle, traffic congestion, other vehicles, pedestrians, distance to road edge/curb, and weather conditions.

Provided herein is a fleet comprising a plurality of vehicles operating autonomously and a fleet management module (associated with a central server) for coordination of the fleet, the fleet management module configured to coordinate the activity, location and positioning of each vehicle in the fleet, the fleet configured for safe, open-road travel in an unstructured open environment, each vehicle in the fleet comprising: a propulsion system (e.g., a drive system with a propulsion engine, wheels, treads, wings, rotors, blowers, propellers, brakes, etc.); a power system (e.g., battery, solar, gasoline, propane, hybrid, etc.), a navigation module for navigation in the unstructured open environment (e.g., digital maps, HD maps, GPS, etc.); at least one communication module adapted to receive, store and send data to a user and other vehicles in the fleet, between the vehicles of the fleet and between the user and other vehicles in the fleet, related to at least, the conditions in the environment around the vehicle and the fleet interactions, respond to the selection or change the order of destinations, respond to the selection or change of routing to destinations, report geo-positioning of the vehicle, fleet or sub-fleet, report condition of the vehicle (e.g., fuel supply, accidents, component failure, etc.), report speed of vehicle, fleet or sub-fleet, or report ETA for arrival at a destination; a sensor system comprising a plurality of sensors configured to assess a plurality of conditions and/or characteristics concerning the environment around the vehicle; at least one processor configured, at a minimum to manage the propulsion system, the power system, the navigation module, the fleet management module, and the at least one communication module; a first software module, executed by the at least one processor to apply one or more algorithms to data from the plurality of sensors to manage lane positioning of the autonomous or semi-autonomous vehicle by determining the edges or boundaries of a navigable pathway and position the autonomous or semi-autonomous vehicle within a specified distance from one or more of said edges or boundaries; a second software module, executed by the at least one processor to apply one or more algorithms to data from the navigation module, acting in parallel to the first software module to manage lane positioning of the autonomous or semi-autonomous vehicle in the unstructured open environment by confirming the position of the vehicle relative to a known (digital) map and geo-positioning provided by the navigation module (e.g., GPS); and a third software module, executed by the at least one processor to apply one or more algorithms to data collected from the plurality of sensors to identify, document, and adjust for one or more of: speed of a lead vehicle; distance apart from a lead vehicle; road conditions (e.g., wet/dry roads, etc.); detected obstacles above, below or on either side of the lead vehicle; traffic congestion; and weather conditions.

In some embodiments, each vehicle in the fleet further comprise a fourth software module, executed by the at least one processor to apply one or more algorithms to data from the plurality of sensors, the third software module and the navigation module to generate a platooning (convoying) behavior, by modifying the position and speed of the vehicle in response to the lead vehicle, the navigable pathway conditions and detected obstacles or environmental conditions causing the vehicle to draft behind the lead vehicle.

In some embodiments, the third software module, executed by the at least one processor, applies one or more algorithms to data collected from the plurality of sensors to identify, and adjust lane positioning when there is no lead vehicle within the roadway.

Provided herein is a fleet comprising a plurality of vehicles operating autonomously and a fleet management module (associated with a central server) for coordination of the fleet, the fleet management module configured to coordinate the activity, location and positioning of each vehicle in the fleet, the fleet configured for safe, open-road travel in an unstructured open environment, each vehicle in the fleet comprising: a propulsion system (e.g., a drive system with a propulsion engine, wheels, treads, wings, rotors, blowers, propellers, brakes, etc.); a navigation module for navigation in the unstructured open environment (e.g., digital maps, GPS); at least one communication module adapted to receive, store and send data to a user and other vehicles in the fleet, between the vehicles of the fleet and between the user and other vehicles in the fleet, related to at least, the conditions in the environment around the vehicle and the fleet interactions, respond to the selection or change the order of destinations, respond to the selection or change of routing to destinations, report geo-positioning of the vehicle, fleet or sub-fleet, report condition of the vehicle (e.g., fuel supply, accidents, component failure), report speed of vehicle, fleet or sub-fleet, or report ETA for arrival at a destination; a sensor system comprising a plurality of sensors configured to assess a plurality of conditions and/or characteristics concerning the environment around the vehicle; at least one processor configured, at a minimum to manage the propulsion system, the navigation module, the fleet management module, and the at least one communication module; a first software module, executed by the at least one processor to apply one or more algorithms to data from the plurality of sensors to manage lane positioning of the autonomous or semi-autonomous vehicle by determining the edges or boundaries of a navigable pathway and position the autonomous or semi-autonomous vehicle within a specified distance from one or more of said edges or boundaries; a second software module, executed by the at least one processor to apply one or more algorithms to data from the navigation module, acting in parallel to the first software module to manage lane positioning of the autonomous or semi-autonomous vehicle in the unstructured open environment by confirming the position of the vehicle relative to a known (digital) map and geo-positioning provided by the navigation module (e.g., GPS); and a third software module, executed by the at least one processor to apply one or more algorithms to data collected from the plurality of sensors to identify, document, and adjust for one or more of: speed of a lead vehicle; distance apart from a lead vehicle; road conditions (e.g., wet/dry roads, etc.); detected obstacles above, below or on either side of the lead vehicle; traffic congestion; and weather conditions.

In some embodiments, each vehicle in the fleet further comprise a fourth software module, executed by the at least one processor to apply one or more algorithms to data from the plurality of sensors, the third software module and the navigation module to generate a platooning (or convoying) behavior, by modifying the position and speed of the vehicle in response to the lead vehicle, the navigable pathway conditions and detected obstacles or environmental conditions causing the vehicle to draft behind the lead vehicle.

In some embodiments, the first, second, third, and fourth software modules may all be part of a single consolidated algorithm that takes in all three sources of information from the plurality of sensors, the third software module, and the navigation module.

In some embodiments, when exhibiting a platooning behavior, the lead vehicle comprises: a vehicle operated by a human, or at least one vehicle from the plurality of vehicles is following the vehicle operated by a human.

In some embodiments, the fleet is fully-autonomous. In some embodiments, the fleet is semi-autonomous. In some embodiments, the fleet is controlled directly by a user. In some embodiments, a plurality of said autonomous or semi-autonomous vehicles within the fleet is operated on behalf of a third-party vendor/service provider.

In some embodiments, the fleet is configured for land travel as a land vehicle. In some embodiments, the fleet is configured for water travel as a watercraft. In some embodiments, the fleet is configured for hover travel as an over-land or over-water hovercraft. In some embodiments, the fleet is configured for air travel as an aerial drone or aerial hovercraft. In some embodiments the lead vehicle is remotely operated by a human.

In some embodiments the unstructured open environment is a non-confined geographic region accessible by navigable pathways comprising: public roads; private roads; bike paths; open fields, open public lands, open private lands, pedestrian walkways, lakes, rivers, or streams.

In some embodiments the unstructured open environment is a non-confined geographic airspace safely accessible by navigable unmanned drone aircraft comprising: anywhere at an altitude allowing for a safe, controlled or emergency landing without undue hazard to persons or property on the ground; anywhere at a cruising altitudes at least 100 feet above ground level (AGL) in populated areas; anywhere at a cruising altitudes at least 200 feet above the highest obstacle within the horizontal distance of less than 500 feet in congested areas.

In some embodiments, the first (lane positioning) software module is configured to position the autonomous or semi-autonomous vehicle at or about a position inside of the left edge or left boundary of the navigable pathway.

In some embodiments, the first (lane positioning) software module is configured to position the autonomous or semi-autonomous vehicle at or about a position inside of the right edge or right boundary of the navigable pathway.

In some embodiments the first (lane positioning) software module is configured to position the autonomous or semi-autonomous vehicle at or about a given position between the left edge or left boundary and the right edge or right boundary of the navigable pathway. In some embodiments the first (lane positioning) software module is configured to position the autonomous or semi-autonomous vehicle in the center of the lane to provide maximum distance to left and right sides.

In some embodiments, the third software module is configured to assess and cause the digital processing device to respond to a detected lead vehicle and environmental conditions comprising: the lead vehicle speed; the vehicle location within a navigable pathway; the environmental conditions; the detected obstacles within the environment near to or approaching the vehicle; and the necessary reaction time to implement a corrective maneuver; wherein the third software module applies one or more algorithms to data from the plurality of sensors to determine corrective adjustments to the lane position and speed of the autonomous or semi-autonomous vehicle to safely navigate through said environmental conditions.

In some embodiments, the third software module may cause the vehicle to slow down or stop when environmental conditions are not detectable or when the digital processing device is unable to understand the environmental conditions within a given set of program parameters.

In some embodiments, the fourth (platooning behavior) software module is configured to activate in response to conditions comprising any one of, or one or more of: another non-fleet vehicle moving in the same direction; when there is a vehicle operated by a human (e.g., an expert) operator or (non-fleet) lead vehicle, wherein said vehicle is configured to operate as part of a fleet or a sub-fleet; and when there is more than one vehicle going to a same destination at the same time; or when there is more than one vehicle simultaneously moving along a common route, but to different end destinations; or when there is more than one vehicle going to or from multiple destinations along at least part of a common route.

In some embodiments, the fourth (platooning behavior) software module is configured to activate in response to environmental conditions wherein safety of the autonomous or semi-autonomous vehicle is in question and/or environmental conditions suggest conservative operating behavior. In some embodiments, the fourth (platooning behavior) software module is configured to cause each vehicle follow a lead vehicle or lead (non-fleet) vehicle, either directly behind or at some lateral offset.

In some embodiments, the fourth (platooning behavior) software module further comprises algorithms configured for causing the plurality of vehicles in a platoon to effectively and efficiently negotiate turns in navigable pathways whereby platoon shadowing is employed, such that the vehicle following a lead vehicle would move into a position abaft the lead vehicle, traveling at or about the same speed.

In some embodiments, the fourth (platooning behavior) software module further comprises algorithms configured for causing the plurality of vehicles in a platoon to effectively and efficiently follow a lead vehicle in a manner whereby platoon shadowing is employed, such that it generates a slipstreaming benefit.

In some embodiments, the environmental conditions suggesting conservative operating behavior comprise: poor weather conditions; road construction; traffic accidents; crowded road conditions; high pedestrian traffic; narrow lanes/roads; school zones; hospital zones; unidentified obstacles in the road; or when the vehicle is uncertain because the digital processing device cannot determine an alternative safe operating mode.

In some embodiments, an environmental condition suggesting conservative operating behavior further comprises the inability of the vehicle to determine discernible edges or boundaries of the navigable pathway, thus requiring platooning (or convoying) behind a non-autonomous vehicle operated by a human operator or any non-fleet vehicle or any non-fleet autonomous or semi-autonomous vehicle.

In some embodiments, the vehicle sensory systems may monitor and adjust for how much room the vehicle has on each side within the lane, and what exists adjacent to the vehicle within the lane.

In some embodiments, a safety condition suggesting conservative operating behavior further comprises configuring the fleet vehicle to platoon (convoy) behind another non-fleet autonomous or semi-autonomous vehicle. In some embodiments, a safety condition suggesting conservative operating platooning behavior further comprises navigating on narrow roads or near parked cars or in high pedestrian areas or other potentially higher risk scenarios. In some embodiments, the autonomous or semi-autonomous vehicle is a larger vehicle that may provide an early warning to the vehicle and to other road users. In some embodiments, the fourth (platooning behavior) software module is not executed by the at least one processor when the lead vehicle is: a bicycle; a motorcycle; narrower than the autonomous or semi-autonomous vehicle; moving faster than the maximum speed of the autonomous or semi-autonomous vehicle.

In some embodiments, the fourth (platooning behavior) software module is executed by the at least one processor when the edges or boundaries of a navigable pathway are not consistently discernible; or wherein there is a conflict between the navigation module (e.g., digital maps, GPS) and the sensors configured to detect the edges or boundaries of a navigable pathway.

In some embodiments, the autonomous or semi-autonomous vehicles are configured for: land travel; water travel; or air travel.

In some embodiments, the autonomous or semi-autonomous vehicles are configured with a maximum speed range from 13 mph to 90 mph.

In some embodiments, the autonomous or semi-autonomous vehicles further comprise a plurality of securable compartments to hold goods.

In some embodiments, a plurality of said autonomous or semi-autonomous vehicles within the fleet is further configured to be part of a sub-fleet comprising a sub-plurality of autonomous or semi-autonomous vehicles. In further embodiments, each sub-fleet is configured to operate independently or in tandem with multiple sub-fleets comprising two or more sub-fleets.

Provided herein is a fleet comprising a plurality of vehicles operating autonomously or semi-autonomously; and a fleet management module for coordination of the fleet; wherein the fleet management module is configured to coordinate the activity, location, and positioning of each vehicle in the fleet; wherein the fleet is configured for safe, open-road travel in an unstructured, open environment; and wherein each vehicle in the fleet comprises: a propulsion system; a power system; a navigation module for navigation in the unstructured open environment; at least one communication module adapted to receive and transmit data to a fleet management module, a user and other vehicles in the fleet, between the vehicles of the fleet and between the user and other vehicles in the fleet, related to at least, the conditions in the environment around the vehicle and the fleet interactions; a sensor system comprising a plurality of sensors configured to detect the environment around the vehicle; at least one processor configured to manage the propulsion system, the power system, the navigation module, the sensor system, and the at least one communication module; a first software module, executed by the at least one processor, to apply one or more algorithms to data from the plurality of sensors to manage lane positioning of the autonomous or semi-autonomous vehicle by determining the edges or boundaries of a navigable pathway and position the autonomous or semi-autonomous vehicle within a specified distance from one or more of said edges or boundaries; and a second software module, executed by the at least one processor, to apply one or more algorithms to data from the navigation module, acting in parallel to the first software module to manage lane positioning of the autonomous or semi-autonomous vehicle in the unstructured open environment by confirming the position of the vehicle relative to a known map and geo-positioning provided by the navigation module.

Provided herein is a fleet comprising a plurality of vehicles operating autonomously; and a fleet management module for coordination of the fleet; wherein the fleet management module is configured to coordinate the activity, location, and positioning of each vehicle in the fleet; wherein the fleet is configured for safe, open-road travel in an unstructured, open environment; and wherein each vehicle in the fleet comprises: a propulsion system; a power system; a navigation module for navigation in the unstructured open environment; at least one communication module configured to receive, store, and transmit data to a fleet management module, a user and other vehicles in the fleet, between the vehicles of the fleet and between the user and other vehicles in the fleet, related to at least, the conditions in the environment around the vehicle and the fleet interactions; a sensor system comprising a plurality of sensors configured to detect the environment around the vehicle; at least one processor configured to manage the propulsion system, the power system, the navigation module, the sensor system, and the at least one communication module; and to assess the data provided by the sensor system as it relates to the vehicle's navigation; and a third software module, executed by the at least one processor, to apply one or more algorithms to data collected from the plurality of sensors to identify, document, and adjust for one or more of: speed of a lead vehicle, distance apart from a lead vehicle, road conditions, detected obstacles above, below or on either side of the lead vehicle, traffic congestion, and weather conditions.

In some embodiments, each vehicle in the fleet further comprises a fourth software module, executed by the at least one processor to apply one or more algorithms to data from the plurality of sensors, the third software module and the navigation module to generate a platooning behavior, by modifying the position and speed of the vehicle in response to the lead vehicle, the navigable pathway conditions and detected obstacles or environmental conditions causing the vehicle to draft behind the lead vehicle.

In some embodiments, when the fleet is exhibiting a platooning behavior, the lead vehicle comprises: an autonomous or semi-autonomous vehicle; a semi-autonomous vehicle; a vehicle operated by a human; or a non-fleet autonomous or semi-autonomous vehicle; a vehicle from the plurality of vehicles that is following the vehicle operated by a human.

In some embodiments, the lead vehicle is remotely operated.

In some embodiments, the unstructured open environment is a non-confined geographic region accessible by navigable pathways comprising one or more of: public roads, private roads, bike paths, open fields, open public lands, open private lands, pedestrian walkways, lakes, rivers, streams, and open airspace.

In some embodiments, the first software module is configured to position the autonomous or semi-autonomous vehicle at or about a position inside of the left edge or left boundary of the navigable pathway.

In some embodiments, the first software module is configured to position the autonomous or semi-autonomous vehicle at or about a position inside of the right edge or right boundary of the navigable pathway.

In some embodiments, the first software module is configured to position the autonomous or semi-autonomous vehicle at or about a given position between the left edge or left boundary and the right edge or right boundary of the navigable pathway.

In some embodiments, the third software module is configured to assess and cause the digital processing device to respond to a detected lead vehicle and environmental conditions comprising one or more of: the lead vehicle speed, the vehicle location within a navigable pathway, the detected obstacles within the environment near to or approaching the vehicle, and the necessary reaction time to implement a corrective maneuver; wherein the third software module applies one or more algorithms to data from the plurality of sensors to determine corrective adjustments to the lane position and speed of the autonomous or semi-autonomous vehicle to safely navigate through said environmental conditions.

In some embodiments, the third software module may cause the vehicle to slow down or stop when environmental conditions are not detectable or when the digital processing device is unable to understand the environmental conditions within a given set of program parameters.

In some embodiments, the fourth (platooning behavior) software module is configured to activate in response to conditions comprising: when there is a vehicle operated by a human operator or non-fleet vehicle; wherein said vehicle is configured to operate as part of a fleet or a sub-fleet, and when there is more than one vehicle going to a same destination at the same time; or when there is more than one vehicle simultaneously moving along a common route, but to different end destinations; or when there is more than one vehicle going to or from multiple destinations along at least part of a common route.

In some embodiments, the fourth (platooning behavior) software module is configured to activate in response to environmental conditions wherein safety of the autonomous or semi-autonomous vehicle is in question and/or environmental conditions suggest conservative operating behavior.

In some embodiments, the environmental conditions suggesting conservative operating behavior comprise one or more of: poor weather conditions, road construction, traffic accidents, crowded road conditions, high pedestrian traffic, narrow lanes, narrow roads, school zones, hospital zones, unidentified obstacles in the road, and when the vehicle is uncertain because the digital processing device cannot determine an alternative safe operating mode.

In some embodiments, the fourth (platooning behavior) software module is not executed by the at least one processor when the lead vehicle is: a bicycle; a motorcycle; narrower than the autonomous or semi-autonomous vehicle; moving faster than the top speed of the autonomous or semi-autonomous vehicle; or wherein the edges or boundaries of a navigable pathway are not consistently discernible; or wherein there is a conflict between the navigation module (e.g., digital maps, GPS, etc.) and the sensors configured to detect the edges or boundaries of a navigable pathway.

In some embodiments, the fourth (platooning behavior) software module is executed by the at least one processor when the edges or boundaries of a navigable pathway are not consistently discernible; or there is a conflict between the navigation module (e.g., digital maps, GPS, etc.) and the sensors configured to detect the edges or boundaries of a navigable pathway.

In some embodiments, the fourth (platooning behavior) software module further comprises algorithms configured for causing the plurality of vehicles in a platoon to effectively and efficiently negotiate turns in navigable pathways whereby platoon shadowing is employed, such that the vehicle following a lead vehicle would move into a position abaft the lead vehicle, traveling at or about the same speed.

In some embodiments, the autonomous or semi-autonomous vehicles are configured for: land travel; water travel; or air travel.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings of which:

DETAILED DESCRIPTION OF THE INVENTION

This disclosure relates to a fleet comprising a plurality of vehicles operating autonomously and/or and semi-autonomously and a fleet management module for coordination of the fleet, each vehicle configured for safe, open-road travel in an unstructured open environment and further configured to utilize lane positioning and platooning to optimize safety and efficiency.

This disclosure relates to a fleet comprising a plurality of vehicles operating autonomously and/or and semi-autonomously and a fleet management module for coordination of the fleet, each vehicle configured for safe, open-road travel in an unstructured open environment and further configured to utilize lane positioning and platooning to optimize safety and efficiency, each vehicle comprising, a propulsion system, a navigation module, a sensor system comprising a plurality of sensors, multiple software modules, at least one communication module and at least one processor configured to manage the propulsion system, the navigation module, the plurality of sensors, the plurality of software modules and the at least one communication module.

Fleet of Vehicles

Figure 1:
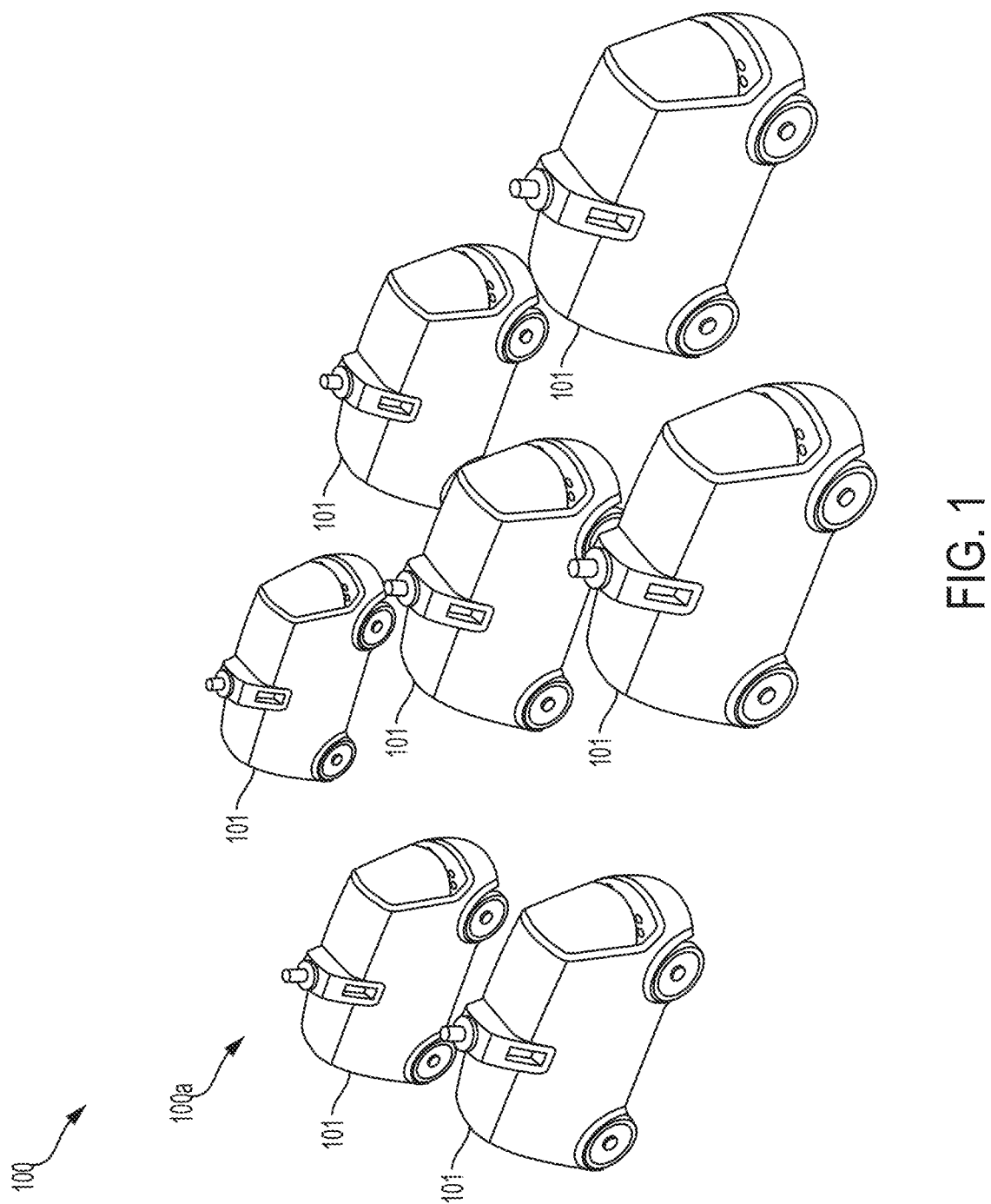
FIG. 1 is an illustration of an exemplary autonomous or semi-autonomous fleet comprising a sub-fleet, in accordance with some embodiments.
Figure 2:
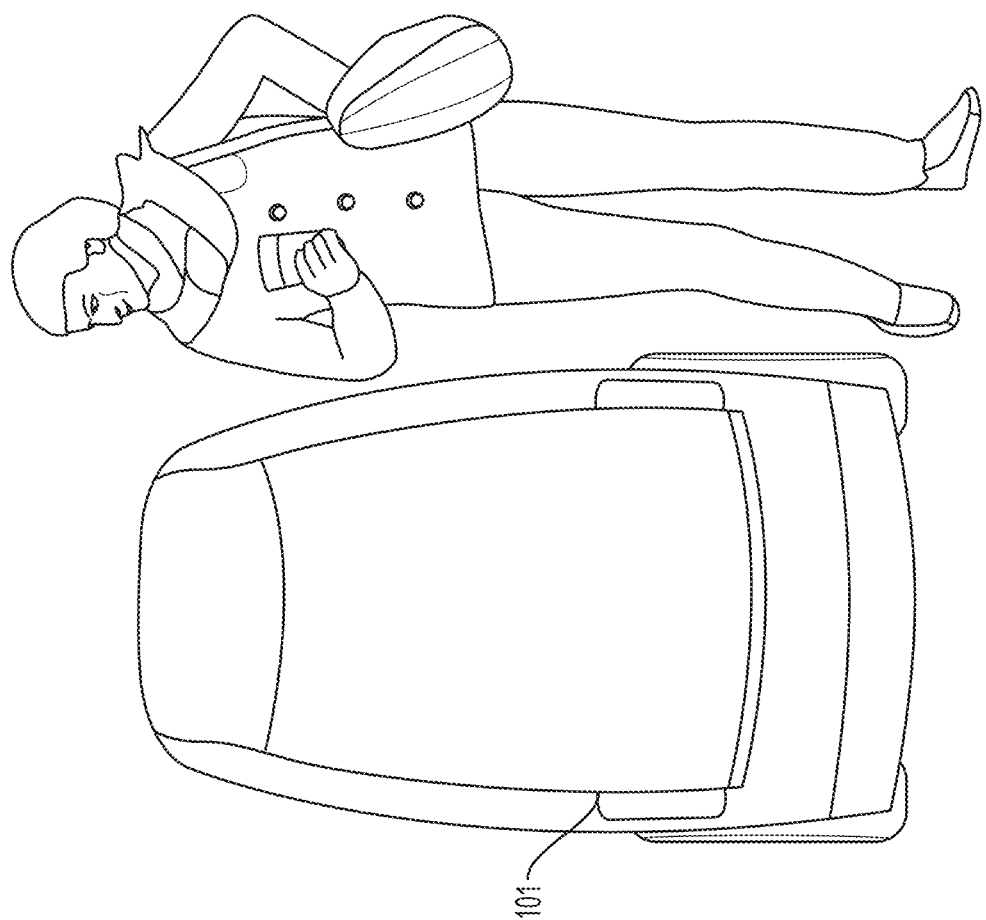
FIG. 2 is a front view an exemplary autonomous or semi-autonomous vehicle, in accordance with some embodiments.

Provided herein, per FIG. 1 is an autonomous or semi-autonomous fleet 100 comprising a plurality of autonomous or semi-autonomous vehicles 101.

In some embodiments, one or more of the vehicles 101 within the fleet 100 are configured to be part of a sub-fleet 100a that operates independently or in tandem with other sub-fleets 100a. In one example, the sub-fleet 100a of vehicles 101 may only provide a product, service, or level of service associated with a single vendor. Each of the vehicles 101 in the sub-fleet 100a may display a logo of the vendor or an alternative indicator representing the specific product, service, or level of service associated with that vehicle 101. Levels of service may include immediate dedicated rush service, guaranteed morning/afternoon delivery service, and general delivery service. Some sub-fleets 100a may offer a faster or more prioritized service than other sub-fleets 100a. Each sub-fleet 100a may comprise 1, 2, 3, 4, 5, 10, 15, 20, 50, 100, 200, 300, 400, 500, 700, 1,000, 2,000, 3,000, 5,000, 10,000 or more autonomous or semi-autonomous vehicles 101, including increments therein. The two or more sub-fleets 100a may operate independently or in tandem.

In one example of the operations of sub-fleets of autonomous or semi-autonomous vehicles, an independent survey company rents or leases a sub-fleet of 10 autonomous or semi-autonomous vehicles which are partially or completely dedicated to the tasks and/or services of the survey company. The sub-fleet may comprise "white label" vehicles carrying the logo of the survey company.

In some embodiments, when exhibiting a platooning behavior, the lead vehicle comprises: a vehicle operated by a human, or at least one vehicle from the plurality of vehicles is following the vehicle operated by a human.

Autonomous or Semi-Autonomous Vehicles

As illustrated in FIGS. 1-5, the vehicle 101 may comprise an autonomous or semi-autonomous vehicle configured for land travel. The vehicle 101 may have a width, a height, and a length, wherein the length is about 2 feet to about 5 feet. The vehicle 101 may be lightweight and have a low center of gravity for increased stability. The vehicle 101 may be configured for land, water, or air. The vehicle 101 may comprise a land vehicle such as, for example, a car, a wagon, a van, a tricycle, a truck, a trailer, a bus, a train, or a tram. The vehicle 101 may comprise a watercraft such as, for example, a ship, a boat, a ferry, a landing craft, a barge, a raft, a hovercraft, or any combination thereof. Alternatively, the vehicle 101 may comprise an aircraft or a spacecraft.

Each vehicle 101 in the fleet may comprise an autonomous propulsion system 103 comprising a drive system, a propulsion engine, a wheel, a treads, a wing, a rotor, a blower, a rocket, a propeller, a brake, or any combination thereof.

In one exemplary embodiment, a vehicle 101 comprises a land vehicle configured with a traditional 4-wheeled automotive configuration comprising conventional steering and braking systems. In this embodiment, the drive train may be configured for standard 2-wheel drive or 4-wheel all-terrain traction drive, and the propulsion system may be configured as a gas engine, a turbine engine, an electric motor, and/or a hybrid gas/electric engine.

In some embodiments, the vehicle 101 is configured for water travel as a watercraft with a propulsion system comprising a gas engine, a turbine engine, an electric motor and/or a hybrid gas/electric engine, or any combination thereof. In some embodiments, the vehicle 101 is configured for hover travel as an over-land or over-water hovercraft or an air-cushion vehicle (ACV) and is configured with blowers to produce a large volume of air below the hull that is slightly above atmospheric pressure. In some embodiments, the vehicle 101 is configured for air travel as an aerial drone or aerial hovercraft and is configured with wings, rotors, blowers, rockets, and/or propellers and an appropriate brake system.

The vehicle 101 may further comprise an auxiliary solar power system to provide back-up emergency power or power for minor low-power sub-systems. In some embodiments, each vehicle of the fleet is configured with one or more power sources, such as battery, solar, gasoline, or propane. In some embodiments, the vehicle 101 further comprises a digital display for curated content comprising advertisements, marketing promotions, a public service notification, an emergency notification, or any combination thereof.

Each vehicle 101 in the fleet 100 may comprise a sensor system comprising a plurality of onboard sensors such as, for example, a camera, a video camera, a LiDAR, a radar, an ultrasonic sensor, and a microphone. Each vehicle 101 may further comprise an internal computer for real time navigation and obstacle avoidance, based on the data received by the sensors. In some embodiments, the vehicles may further comprise an autonomous propulsion system sensor configured to monitor drive mechanism performance (e.g., the propulsion engine), power system levels (e.g., battery, solar, gasoline, propane, etc.), monitor drive train performance (e.g., transmission, tires, brakes, rotors, etc.), or any combination thereof.

In some embodiments, the vehicle is further configured to process or manufacture a good. In some embodiments, the vehicle is configured to process or manufacture the good in-transit. In some embodiments, the processed or manufactured good comprises: a beverage with or without condiments (such as coffee, tea, carbonated drinks, etc.), a fast food, a microwavable food, a reheatable food, or a rehydratable food. In some embodiments, the vehicle is equipped for financial transactions through debit or credit card readers.

In some embodiments, the vehicle 101 has a driving speed of about 1 mile per hour (mph) to about 90 mph, to accommodate inner-city, residential, and intrastate or interstate driving. In some embodiments, the vehicle 101 is configured for land travel. In some embodiments, each vehicle 101 in the fleet is configured with a working speed range from 13.0 mph to 45.0 mph. In some embodiments, the vehicle 101 is configured with a maximum speed range from 13.0 mph to about 90.0 mph. In some embodiments, vehicle 101 is configured for water travel as a watercraft and is configured with a working speed range from 1.0 mph to 45.0 mph. In some embodiments, the vehicle 101 is configured for hover travel as an over-land or over-water hovercraft and is configured with a working speed range from 1.0 mph to 60.0 mph. In some embodiments, the vehicle 101 is configured for air travel as an aerial drone or aerial hovercraft and is configured with a working speed range from 1.0 mph to 80.0 mph.

As illustrated in FIGS. 1-5, in some embodiments, the vehicle 101 is configured for land travel. The vehicle 101 may be narrow (i.e., 2-5 feet wide), have a low mass and low center of gravity for stability, and be designed for moderate maximum speed ranges (i.e., 13-90 mph). The vehicle 101 may be designed to accommodate cart paths, bike paths, inner-city, rural, residential main thoroughfares, state and local highway and interstate highway driving speeds. Each land vehicle 101 may be configured to operate within set speed ranges to accommodate for special circumstances such as slow-moving traffic, pedestrian traffic, vehicle towing vehicle, automated parking, and reverse driving. Further each land vehicle 101 may comprise sensors to provide confirmation data, when on-board navigation maps provide conflicting information. Each land vehicle 101 may be programmed to drive at slower speeds for safety during particular scenarios and conditions. The software and hardware sensors may monitor environmental conditions, the operating environment, or other sensed data to determine an appropriate speed at any given time, depending on the circumstances. In some embodiments, the operating speeds in any given environment is governed by on-board the sensors that monitor environmental conditions, the operating environment to determine an appropriate speed at any given time.

Each vehicle 101 may be equipped with a sensor system comprising a plurality of onboard navigation sensors such as a camera (which may run at a high frame rate, akin to video), LiDAR, radar, ultrasonic sensors, microphones, or any other sensor or combination of sensors. The sensors may enable each vehicle 101 to utilize lane positioning and platooning to optimize safety and efficiency while operating in an unstructured open environment. Further, each vehicle 101 in the fleet may utilize internal computer processing to constantly determine safe navigation paths, surrounding objects, and maneuvers thereby to meet set safety parameters. Each vehicle in the fleet may be further equipped with propulsion system sensors to monitor the internal functions of the propulsion system.

In some embodiments, the operating speed range of each vehicle 101 is configured from a full stop to an operating speed range. The operating speed range may be about 1.0 foot per minute (fpm)-1.0 mph, 1.0 fpm-3.0 mph, 1.0 fpm-5.0 mph, 1.0 fpm-7.5 mph, 1.0 fpm-10.0 mph, 1.0 fpm-13.0 mph, 1.0 fpm-15.0 mph, 1.0 fpm-20.0 mph, 1.0 fpm-25.0 mph, 1.0 fpm-30.0 mph, 1.0 fpm-35.0 mph, 1.0 fpm-40.0 mph, 1.0 fpm-45.0 mph, 1.0 fpm-50.0 mph, 1.0 fpm-55.0 mph, 1.0 fpm-60.0 mph, 1.0 fpm-65.0 mph, 1.0 fpm-70.0 mph, 1.0 fpm-75.0 mph, 1.0 fpm-80.0 mph, 1.0 fpm-85.0 mph or 1.0 fpm-90.0 mph. The operating speed range may be determined by the on-board hardware sensors and software monitoring environmental conditions, the operating environment, or any combination thereof, to determine an appropriate speed at any given time.

In addition to a "full stop" condition, each vehicle 101 may also be configured with a "crawl" or "creep" speed comprising a speed range between 1.0 foot/min to 1.0 mph to accommodate for navigating very tight situations, automated parking, pulling another vehicle from an entrapment such as mud or snow, or preparing to stop.

In some embodiments, each vehicle 101 is programmed with a maximum speed range. The maximum speed range may be about 13.0 mph-15.0 mph, 13.0 mph-20.0 mph, 13.0 mph-25.0 mph, 13.0 mph-30.0 mph, 13.0 mph-35.0 mph, 13.0 mph-40.0 mph, 13.0 mph-45.0 mph, 13.0 mph-50.0 mph, 13.0 mph-55.0 mph, 13.0 mph-60.0 mph, 13.0 mph-65.0 mph, 13.0 mph-70.0 mph, 13.0 mph-75.0 mph, 13.0 mph-80.0 mph, 13.0 mph-85.0 mph and 13.0 mph-90.0 mph, as needed, to allow for operation on open roads, bike paths, and other environments where higher speeds are appropriate. In some embodiments, the fleet is configured for land travel. In some embodiments, each vehicle land vehicle in the fleet is configured with a maximum speed range from 13.0 mph to 90.0 mph.

Further still, in some embodiments, the vehicle may be configured for air travel and configured to monitor, collect, and report data. For example, the fleet is configured to monitor and report aerial survey results for any number of situations as would be obvious to one of skill in the art. In some embodiments, the air travel fleet is configured with a maximum speed range from 1.0 mph to 80.0 mph.

In some embodiments, the vehicles 101 are configured with a forward mode, a reverse mode, and a park mode. In some embodiments, the fleet is fully-autonomous. In some embodiments, human interaction between the vehicle 101, and the fleet operator, may be required to address previously unforeseen issues (e.g., a malfunction with the navigation module, a malfunction with the sensor system, unanticipated traffic or road conditions, or a traffic accident, etc.). In some embodiments, it may be necessary to have direct human interaction between the vehicle 101 and/or the fleet operator to address maintenance issues such as mechanical failure, electrical failure or a traffic accident. In some embodiments, the fleet 100 is controlled directly by a user.

In some embodiments, the fleet is configured for water travel as a watercraft and is configured with a maximum speed range from 1.0 mph to 45.0 mph. In some embodiments, the fleet is configured for hover travel as an over-land or over-water hovercraft and is configured with a maximum speed range from 1.0 mph to 60.0 mph. In some embodiments, the fleet is configured for air travel as an aerial drone or aerial hovercraft and is configured with a maximum speed range from 1.0 mph to 80.0 mph. In some embodiments, a plurality of said autonomous or semi-autonomous vehicles within the fleet is operated on behalf of third-party vendor/service provider.

Figure 3:
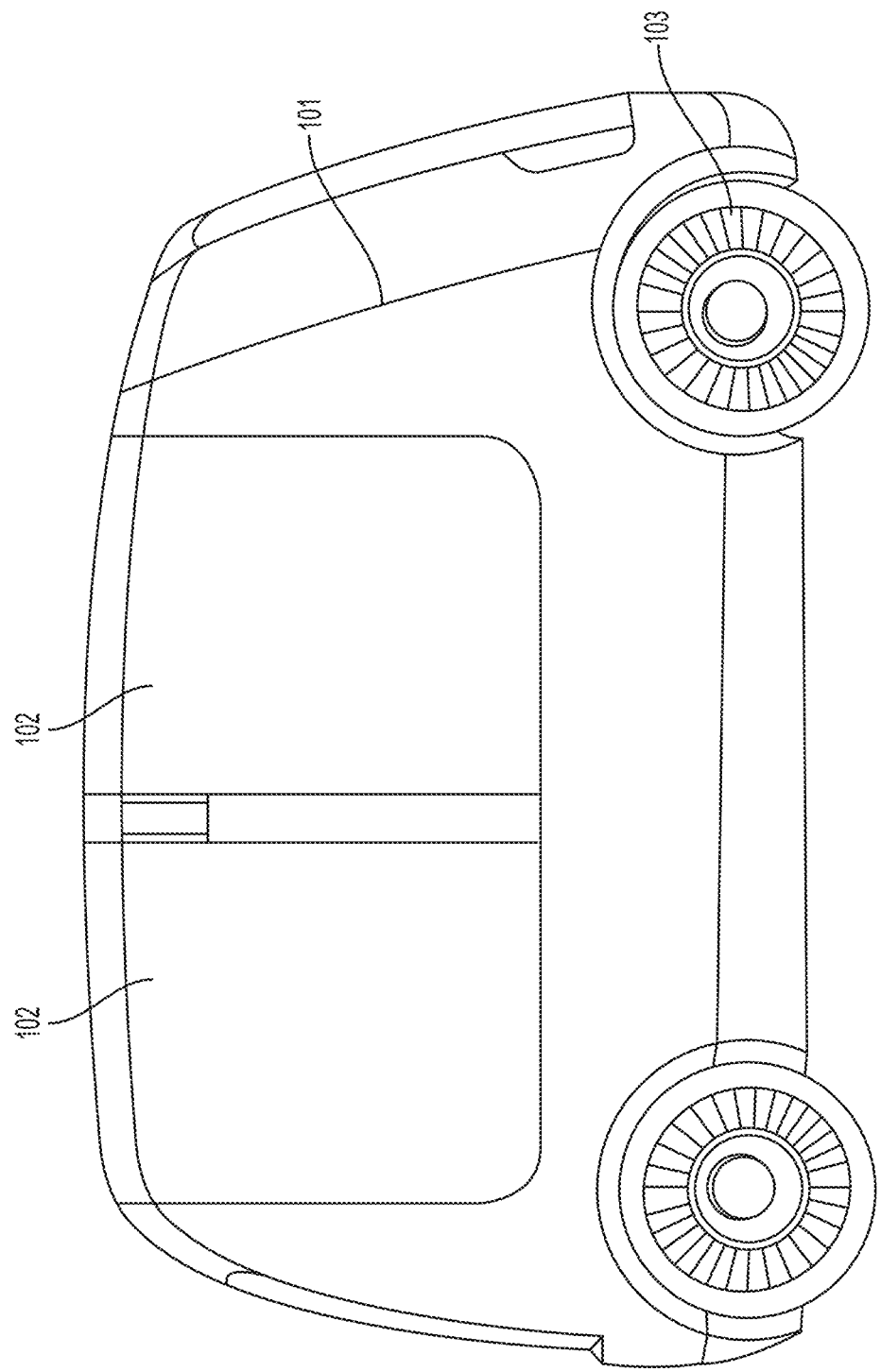
FIG. 3 is a right view an exemplary autonomous or semi-autonomous vehicle, in accordance with some embodiments.
Figure 4:
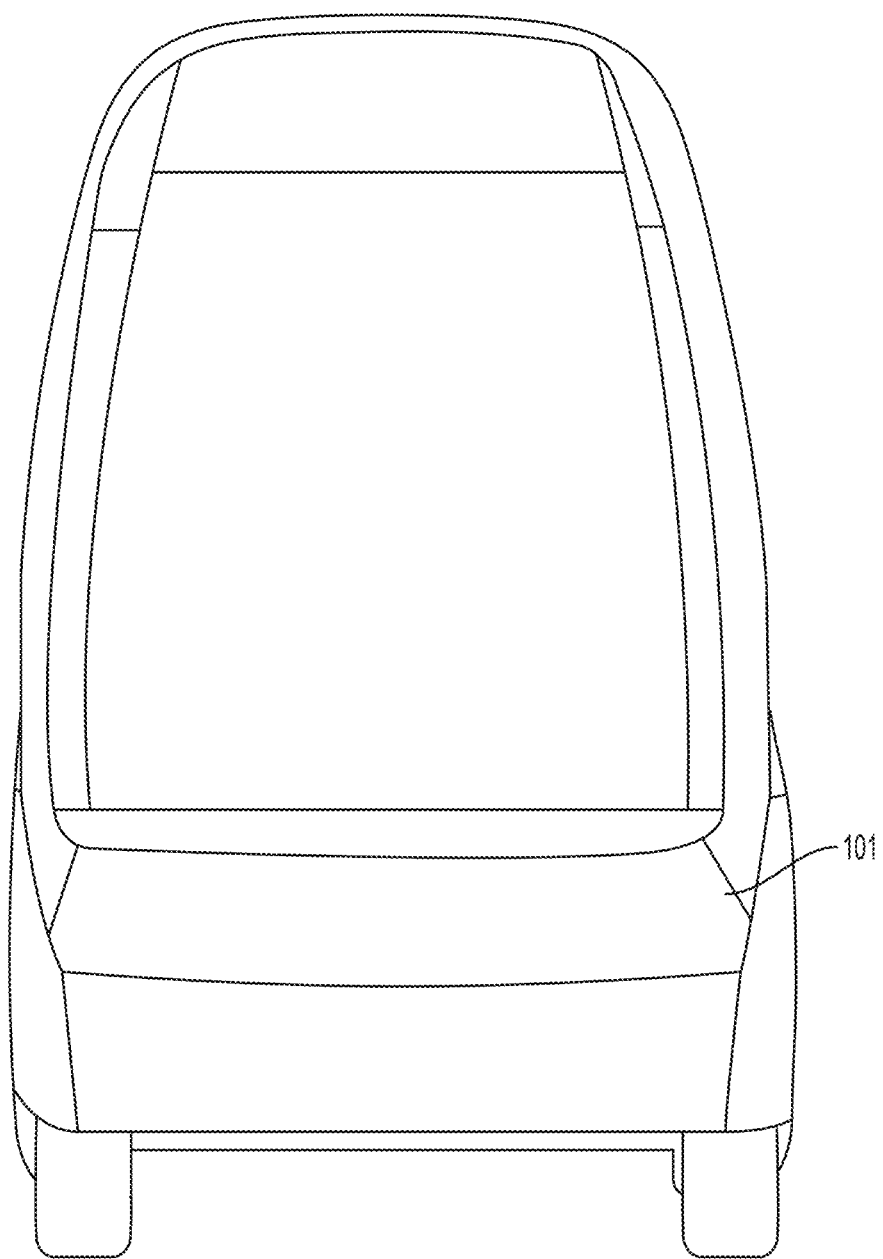
FIG. 4 is a front view an exemplary autonomous or semi-autonomous vehicle, in accordance with some embodiments.

In some embodiments, per FIG. 3, a plurality of the autonomous or semi-autonomous vehicles 101 within the fleet 101 is configured with a securable compartment 102 configured for transporting goods. In some embodiments, a plurality of the autonomous or semi-autonomous vehicles 101 is further configured to be part of a sub-fleet comprising a sub-plurality of autonomous or semi-autonomous vehicles 101, each sub-fleet 100*a* is configured to operate independently or in tandem with multiple sub-fleets 100*a* comprising two or more sub-fleets.

For example, an independent survey company may be established to provide contracted services to various customers requesting land surveys. The independent survey company may rent or lease a fleet of vehicles 101 from a fleet owner and provide a sub-fleet of "white label" vehicles carrying the logo of the independent survey company to their customers, to provide this service, utilizing the vehicles 101 in an autonomous or semi-autonomous fashion.

In some embodiments, the fleet is controlled directly by the user. In some embodiments, if the vehicle 101 breaks down, has an internal system or module failure, each vehicle 101 within the fleet may be configured to allow for direct control of the vehicle's at least one processor to override the conveyance and sensor systems (i.e., cameras, etc.) by a user or fleet operator to allow for the safe return of the vehicle 101 to a base station for repair.

Operating Environments

In some embodiments, the unstructured open environment is a non-confined geographic region accessible by navigable pathways comprising: public roads; private roads, bike paths, open fields, open public lands, open private lands, pedestrian walkways, lakes, rivers, or streams.

In some embodiments, the unstructured open environment is a non-confined airspace or even near-space environment which includes all main layers of the Earth's atmosphere comprising the troposphere, the stratosphere, the mesosphere, the thermosphere and the exosphere.

In some embodiments, the navigation module controls routing of the propulsion system of the vehicles in the fleet in the unstructured open environments.

Fleet Management Module

Figure 6:
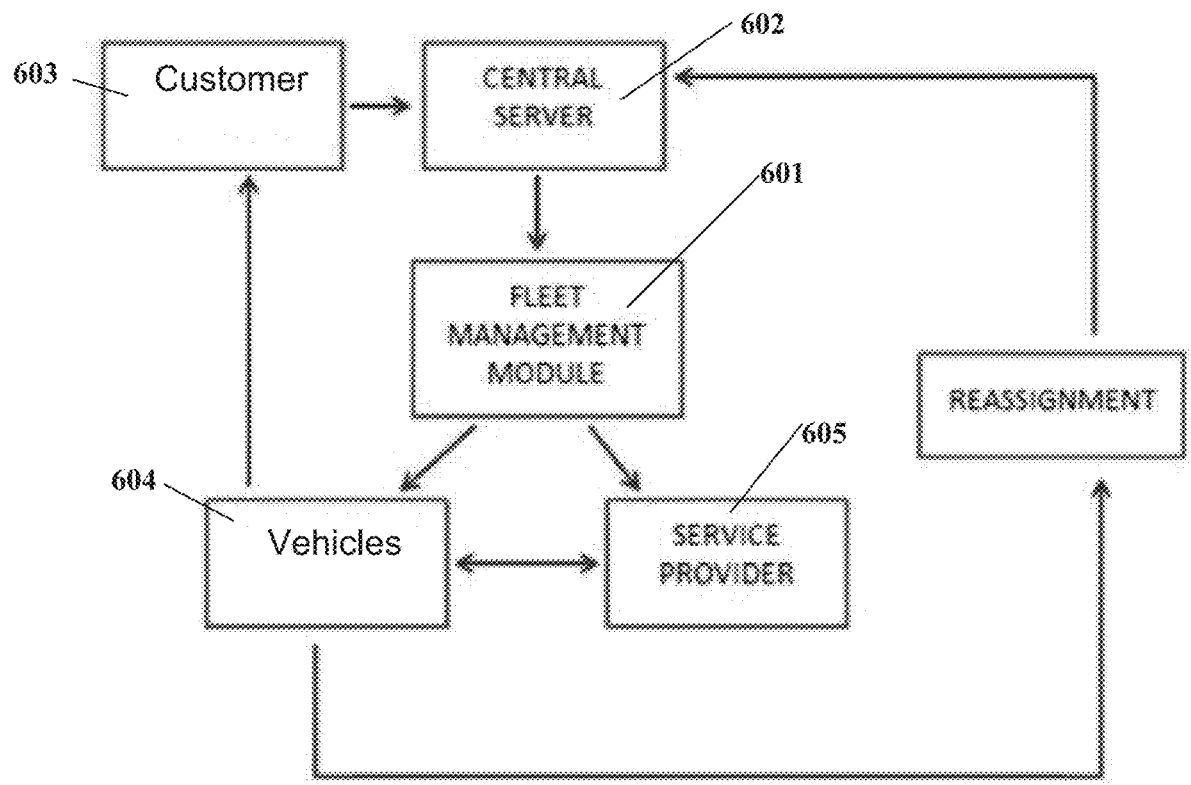
FIG. 6 is a flowchart of an exemplary fleet control system, in accordance with some embodiments.

Provided herein, per FIG. 6, is a system for fleet management comprising a fleet management module 601, a central server 602, a vehicle 604, a customer 603, and a service provider 605. In some embodiments, the fleet management module 601 coordinates, assigns tasks, and monitors the position of each of the plurality of vehicles 604 in the fleet. The fleet management module 601 may coordinate the vehicles 604 in the fleet to monitor and collect data regarding unstructured open or closed environments, and report to the service provider 605. As seen, the fleet management module 601 may coordinate with a central server 602. The central server 602 may be located in a central operating facility owned or managed by the fleet owner. The service provider 605 may comprise a third party provider of a good or service. The service provider 605 may comprise a vendor, a business, a restaurant, a delivery service, a retailer, or any combination thereof.

In some embodiments, the fleet management module 601 is configured to receive, store and transmit data to and/or from the service provider 605. The fleet management module 601 may receive and transmit data to and/or from the service provider 605 via a service provider application. In some embodiments, the service provider application comprises a computer application, an internet application, a tablet application, a phone application, or any combination thereof.

In some embodiments, the central server 602 is configured to receive, store and transmit data to and/or from the customer 603. The central server 602 may receive and transmit data to and/or from the customer 603 via a customer application. In some embodiments, the customer application comprises a computer application, an internet application, a tablet application, a phone application, or any combination thereof.

In some embodiments, the vehicle 604 comprises a memory device to store the data for future data transfer or manual download.

In one example, an order by a customer 603 is transmitted to a central server 602, which then communicates with the fleet management module 601, which relays the order to the service provider 605 associated with the order and a vehicle 604. The fleet management module 601 may employ one or more vehicles 604 or sub-fleet vehicles 604 that are closest to the service provider 605, customer 603, or both. The assigned service provider then interacts with that vehicle 604 through a service provider application to supply the vehicle 604 with any goods, maps, or instructions associated with the order. The vehicle 604 then travels to the customer 603 and reports completion of the order to at least one of the customer 603, the service provider 605, the central server 602, and the fleet management module 601.

In some embodiments the vehicle 604 may be operated on behalf of the service provider 605, wherein at least one of the central server 602 and the fleet management module 601 is operated by the service provider 605. In any one of the embodiments, the vehicle 604 is controlled directly by the customer 603, the service provider 605, or both. In some embodiments, human interaction of the vehicle 604 may be required to address maintenance issues such as mechanical failure, electrical failure or a traffic accident.

In one example, the fleet management module 601 receives an instruction from the service provider 605 to collect an item at a first location and deliver the item to a second location. Upon receipt of the instruction, the fleet management module 601 may assign one or more of the vehicles 604 to perform the instruction by navigating the one or more of the vehicles 604 the first location. The one or more of the vehicles 604 may then confirm the receipt of the item and navigate to the second location. The one or more of the vehicles 604 may then deliver the item to the second location and confirm receipt of the delivery. In some embodiments, the one more of the vehicles 604 may further receive an identification associated with the first location, the second location, or both, to enable receipt and delivery of the item.

In one example, a request by the customer 603 is sent to the central server 602, which then communicates with the fleet management module 601 to relay the request to the service provider 605, which instructs the vehicles 604. The fleet management module 601 may select one or more of the vehicles 604 within the geographic region and/or proximity of the customer 603, the service provider 605, or both. The vehicles 604 may be first directed to a location associated with the service provider 605 to receive an item associated with the request. The vehicle 604 may then travel to a location associated with the customer 603. The customer 603 may then interact with the one or more vehicle 604 to retrieve the item. The customer 603 may retrieve the item by opening a compartment within the vehicle 604. The customer 603 may open the compartment within the vehicle 604 through a customer application, or a customer interface comprising, for example, an RFID reader, a touchpad, a keypad, a voice command, or a vision-based recognition. Upon completion the vehicles 604 may then report a completion of the request to the fleet management module 601 and be reassigned to a subsequent request.

In some embodiments, the autonomous fleet may be strategically positioned throughout a geographic region in anticipation of a known demand. Demand for autonomous or semi-autonomous vehicle services may be predicted by storing historical demand data relating to the quantity, timing, and type of request received in each region. Such demand predictions may further be weighted by the cost or importance of the good or service and employ historical trends for higher efficiency and throughput. As such, the fleet management module may position the autonomous or semi-autonomous vehicles as close as possible to the expected source locations.

In some embodiments, a request is sent by the customer 603 or the service provider 605 to a central server 602. The central server 602 may then communicates with the fleet management module 601. The fleet management module 601 may then relay the request to the appropriate service provider 605, one or more of the vehicles 604, or both. The one or more vehicles 604 may comprise the sub-fleet. The one or more vehicles 604 may be within the geographic region and/or closest to the service provider 605 or the customer 603. The one or more vehicles 604 may then be assigned the task. The service provider 605 may then interact with the one more of the vehicles 604 through a business application. The one or more of the vehicles 604 may then travel to a requested location to perform the service (e.g., road audit, traffic signage survey, the requested land survey, etc.). Upon completion of the service, the one or more of the vehicles 604 may then report completion of the assignment to the customer 603, the fleet management module 601, the service provider 605, or any combination thereof. The one or more of the vehicles 604 may then re-assigned by the fleet management module 601.

Figure 7:
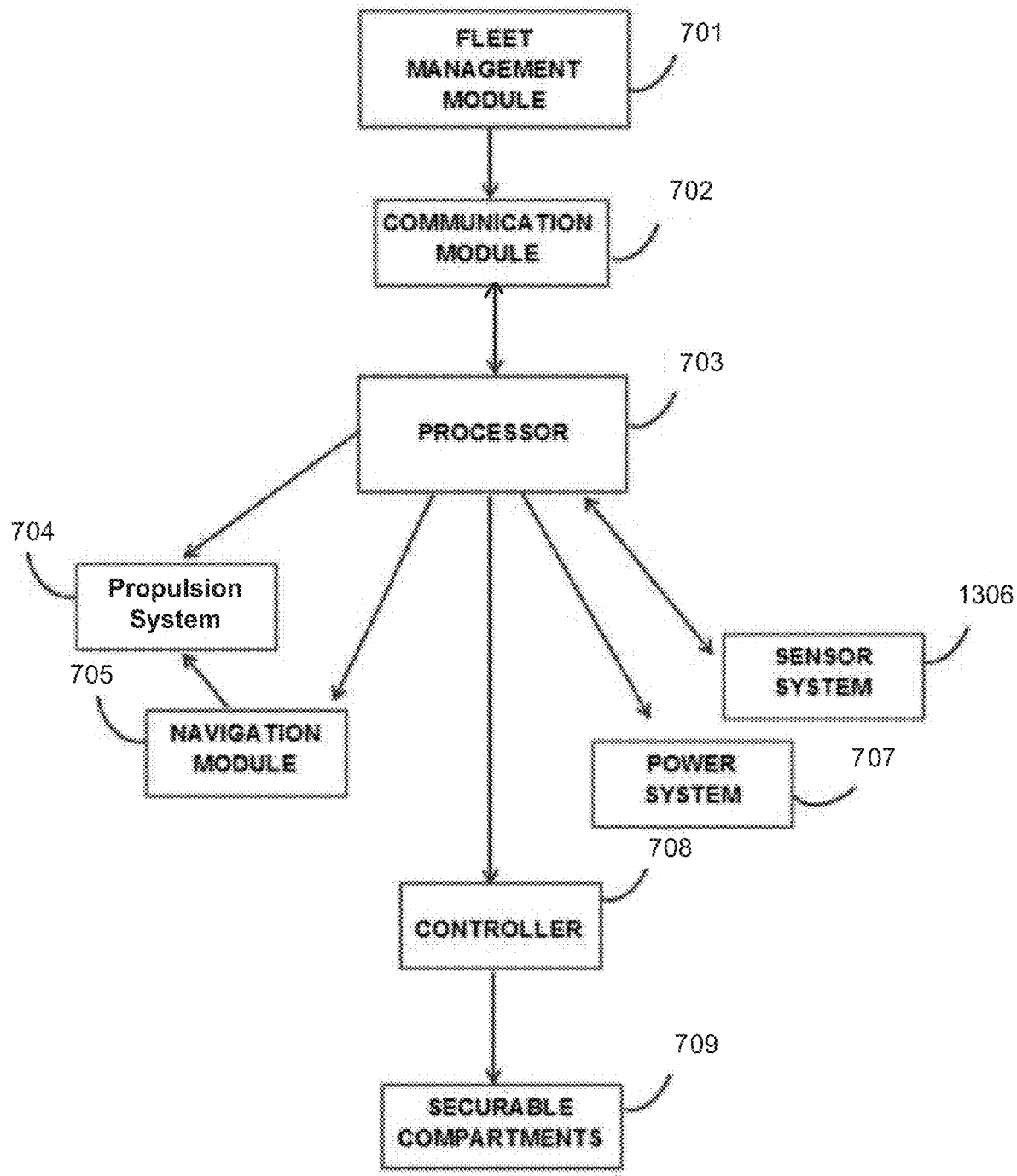
FIG. 7 is a flowchart of an exemplary fleet control module, in accordance with some embodiments.

Per FIG. 7, the fleet management module 701 instructs the processor 703 of the autonomous or semi-autonomous vehicle via a communication module 702. The processor 703 may be configured to send an instruction and receive a sensed data from the sensor system 706, and may further control at least one of the power system 707, the navigation module 705, and the propulsion system 704. The processor 703 may additionally be configured to instruct a controller 708 to open a securable compartment 709 to release any contents associated with an order. The processor 703 may allow manual override of the propulsion system 704, the navigational system 705, or both.

In some embodiments, the processor 703 is in functional communication with the communication module 702. In some embodiments, the communication module 702 is adapted to receive, store, and/or transmit data to and from the customer and the fleet management module 701. In some embodiments, the data comprises a schedule, a request or order, a current location, a delivery location, a service provider location, a route, an estimated time of arrival (ETA), a repositioning instruction, a vehicle condition, a vehicle speed, or any combination thereof. In some embodiments, the processor 703 is capable of both high-level computing for processing as well as low-level safety-critical computing capacity for controlling the hardware. The processor 703 may configured to direct the propulsion system 704, the navigation module 705, the sensor system 706, the power system 707, the controller 708, or any combination thereof. The processor 703 may reside aboard the autonomous or semi-autonomous vehicle, or at a remote location.

In some embodiments, the communication module 702 is configured to receive, store and transmit data via wireless transmission (e.g., 4G, 5G, or satellite communications). In some embodiments, the wireless transmission occurs via: a central server, a fleet management module, a mesh network, or any combination thereof. In some embodiments, the customer application is configured to send and receive data via an electronic device comprising a phone, a personal mobile device, a personal digital assistant (PDA), a mainframe computer, a desktop computer, a laptop computer, a tablet computer, and/or wearable computing device comprising: a communication headset, smart glasses, or a combination thereof.

In some embodiments, the fleet management module 701 directs each of the vehicles through a navigation module 705. In some embodiments, the navigation module 705 controls the propulsion system 704 to translate the autonomous or semi-autonomous vehicle through the unstructured open or closed environments. In some embodiments, the navigation module 705 comprises an HD maps, a weather condition, an elevation map, a digital map, a street view photograph, a GPS point, or any combination thereof. In some embodiments, the map is generated by a customer, a customer, a service provider, a fleet operator, an online repository, a public database, or any combination thereof. In some embodiments, the map is generated only for intended operational geography. The maps may be augmented or confirmed by data obtained by the sensor system 706. The navigation module 705 may further implement data collected by the sensor system 706 to determine the location and/or the surroundings of the autonomous or semi-autonomous vehicle. In some embodiments, the map further comprises a navigation marker comprising a lane, a road sign, an intersection, a grade, or any combination thereof. As such the navigation module 705, in combination with processors and/or applications vehicles, enables a safe, robust navigation trajectory.

In some embodiments, the fleet management module 701 is configured to determine and predict a geographic demand for the autonomous or semi-autonomous vehicles for strategic placement throughout a geographic region in anticipation of a known demand. The fleet management module 701 may determine and predict a geographic demand by storing data relating the location, quantity, time, price, item, item type, service, service type, service provider, or any combination thereof of placed orders and requests. Further, the service provider may provide independently measured trends to supplement or augment the measured trends. As such, the vehicles may be strategically placed to reduce transit and idle time and to increase sales volume and efficiency.

Figure 8:
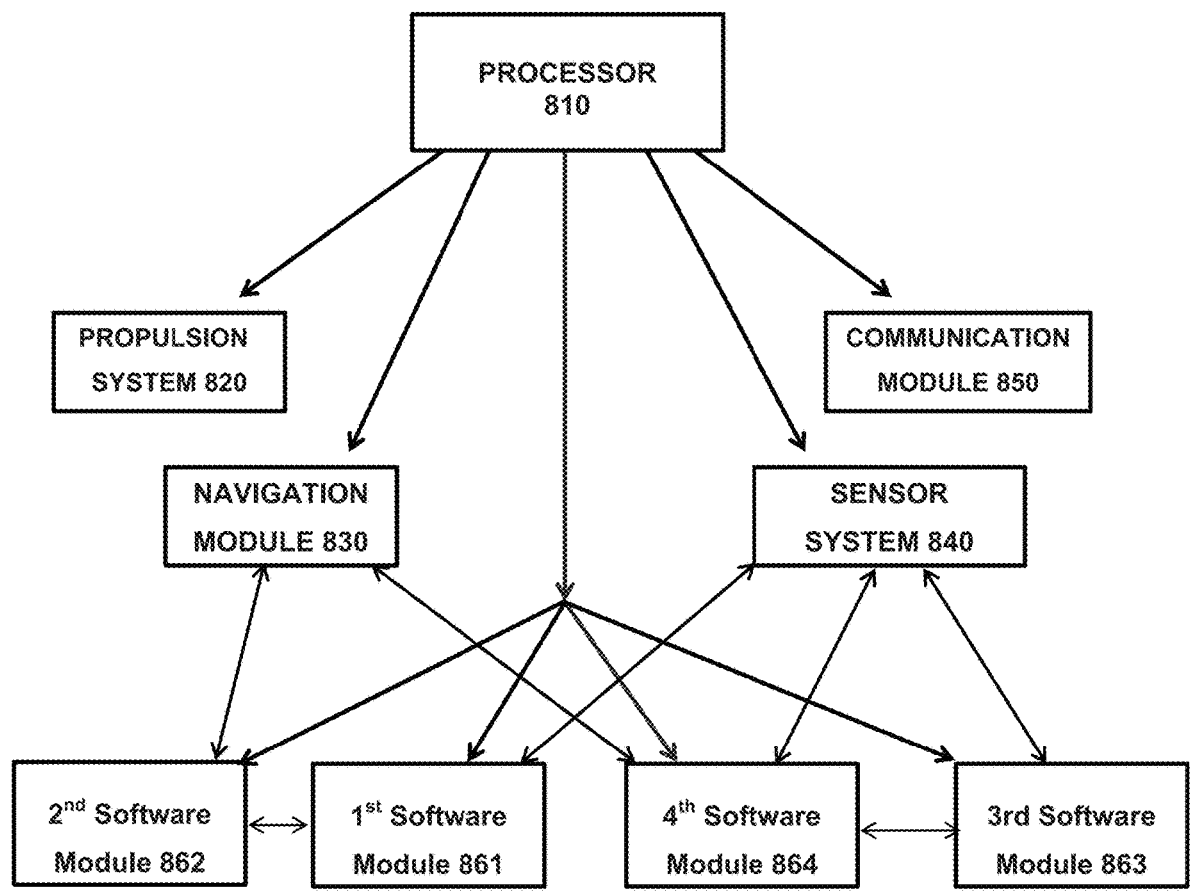
FIG. 8 is a flowchart of another exemplary fleet control module, in accordance with some embodiments.

FIG. 8 is a flowchart of another exemplary fleet control module. As seen, the fleet control module may comprise a processor 810, a propulsion system 820, a navigation module 830, a sensor system 840, a communication module 850, a first software module 861, a second software module 862, a third software module 863, and a fourth software module 864.

At least one processor 810 may manage and processing the various inputs and outputs from the propulsion system 820, the power system, the navigation module 830, the sensor system 840, the at least one communication module 850, and the plurality of software modules 861, 862, 863, and 864. The first software module 861 may apply one or more algorithms to data from the plurality of sensors in the sensor system 840 to manage lane positioning of the autonomous or semi-autonomous vehicle by determining the edges or boundaries of a navigable pathway and position the autonomous or semi-autonomous vehicle within a specified distance from one or more of said edges or boundaries. The second software module 862 may apply one or more algorithms to data from the navigation module 830. The second software module 862 may act in parallel to the first software module 182 to manage lane positioning of the autonomous or semi-autonomous vehicle in the unstructured open environment by confirming the position of the vehicle, relative to a known (digital) map and geo-positioning provided by the navigation module 830. The third software module 863 may apply one or more algorithms to data collected from the sensor system 840 to measure one or more of: a speed of a lead vehicle; a distance apart from a lead vehicle; a road conditions, a detected obstacle above, below, or on either side of the vehicle, a traffic congestion, and a weather condition. The fourth software module 864 may apply one or more algorithms to data from the plurality of sensors in the sensor system 840, in parallel to the third software 863 module and the navigation module 830, to generate a platooning (convoying) behavior, by modifying the position and speed of the vehicle in response to the lead vehicle, the navigable pathway conditions and detected obstacles or environmental conditions causing the vehicle to draft behind the lead vehicle.

In some embodiments, the first software module 861 is configured to assimilate data from the sensors 840, to coordinate with the second software module 862 and navigation module 830 to enable the propulsion system 820 to position the autonomous or semi-autonomous vehicle at or about a position between the left edge or left boundary and the right edge or right boundary of the navigable pathway. In some embodiments the first software module 861 is configured to position the autonomous or semi-autonomous vehicle in the center of the lane to provide maximum distance to left and right sides; (e.g., when going through intersections).

In some embodiments, the third software module 863 is configured to compile and assess data acquired from the plurality of sensors 840 to enable the digital processing device 810 to generate an appropriate response from the navigation module 830 and the propulsion system 820 with respect to the lead vehicle and environmental conditions. The environmental conditions may comprise: the speed of the adjacent lead vehicle; the road conditions (road damage, wet/dry roads, etc.); the vehicle location within a navigable pathway; the distance apart from adjacent vehicles, vehicles or obstacles; the navigable pathway, waterway or airspace environmental conditions; the detected obstacles within the environment near to, above, below, or on either side of the lead vehicle, an approaching the vehicle; a traffic congestion; a detected weather conditions. The third software module 863 may apply one or more algorithms to the sensed data to determine corrective adjustments to the lane position and speed of the autonomous or semi-autonomous vehicle to safely navigate through said environmental conditions.

In some embodiments, the third software module 863 enables the vehicle to slow down or stop when environmental conditions are not detectable, or when the digital processing device 810 is unable to determine or understand the environmental conditions provided by the sensors 840.

In some embodiments, the fourth software module 864 is configured to activate when a human-operated lead vehicle is present, the vehicle operates as part of a fleet or a sub-fleet, wherein more than one vehicle platoons to a common destination at the same time, or when there is more than one autonomous or semi-autonomous vehicle simultaneously sharing at least a portion of a route.

In some embodiments, the fourth software module 864 is configured to activate in response to environmental conditions wherein safety of the autonomous or semi-autonomous vehicle is in question and/or environmental conditions suggest conservative operating behavior. Such conditions may include severe weather, narrow roads, tunnels, questionable road conditions, etc. In some embodiments, the environmental conditions suggesting conservative operating behavior comprise: poor weather conditions; road construction; traffic accidents; crowded road conditions; high pedestrian traffic; narrow lanes/roads; school zones; hospital zones; unidentified obstacles in the road; or when the vehicle is uncertain because the digital processing device cannot determine an alternative safe operating mode. In some embodiments, an environmental condition suggesting conservative operating behavior further comprises the inability of the vehicle to determine discernible edges or boundaries of the navigable pathway, thus requiring platooning or convoying behind a non-autonomous vehicle operated by a human operator, an autonomous or semi-autonomous vehicle, or (non-fleet) lead vehicle.

In some embodiments, the fourth software module 864 further comprises algorithms configured for the platoon to effectively and efficiently negotiate turns in navigable pathways. A platoon shadowing technique may be employed, such that a vehicle following the lead vehicle moves into a position abaft the lead vehicle and travels at or about the same speed. This platooning reduces residual air resistance behind the lead vehicle, and thus fuel consumption for the trailing vehicles.

In some embodiments, the vehicle sensory systems may monitor and adjust for how much room the vehicle has on each side within the lane, and what exists adjacent to the vehicle within the lane. For example, if the vehicle is passing a parked cars and it knows it is in a potentially difficult situation, then its algorithms may attempt to cause the vehicle to generate space between itself and the parked cars. Hence, it may want to closely hug the left side of the lane. However, if no such parked cars exist or the lane is very wide, then it doesn't need to hug the left side of the lane. Thus, lateral distance to objects is a key consideration and an objective the vehicle is trying to maximize (or at least keep above a certain safety threshold, which is based on the vehicle speed and the anticipated (maximum) lateral speed of other objects; (e.g., how quickly a pedestrian could walk out suddenly from behind a parked car)).

In some embodiments, a safety condition suggesting conservative operating behavior further comprises configuring the fleet vehicle to platoon (convoy) behind another non-fleet autonomous or semi-autonomous vehicle. In some embodiments, the autonomous or semi-autonomous vehicle is a larger vehicle that may provide an early warning to the vehicle and to other road users.

In some embodiments, the fourth (platooning behavior) software module 864 is not executed by the at least one processor when the lead vehicle is: a bicycle; a motorcycle; narrower than the autonomous or semi-autonomous vehicle; moving faster than the top speed of the autonomous or semi-autonomous vehicle; or wherein the edges or boundaries of a navigable pathway are not consistently discernible; or wherein there is a conflict between the navigation module 830 (e.g., digital maps, GPS, etc.) and the sensors 840 configured to detect the edges or boundaries of a navigable pathway.

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

System for Navigation within a Plurality of Navigable Pathways

Figure 9:
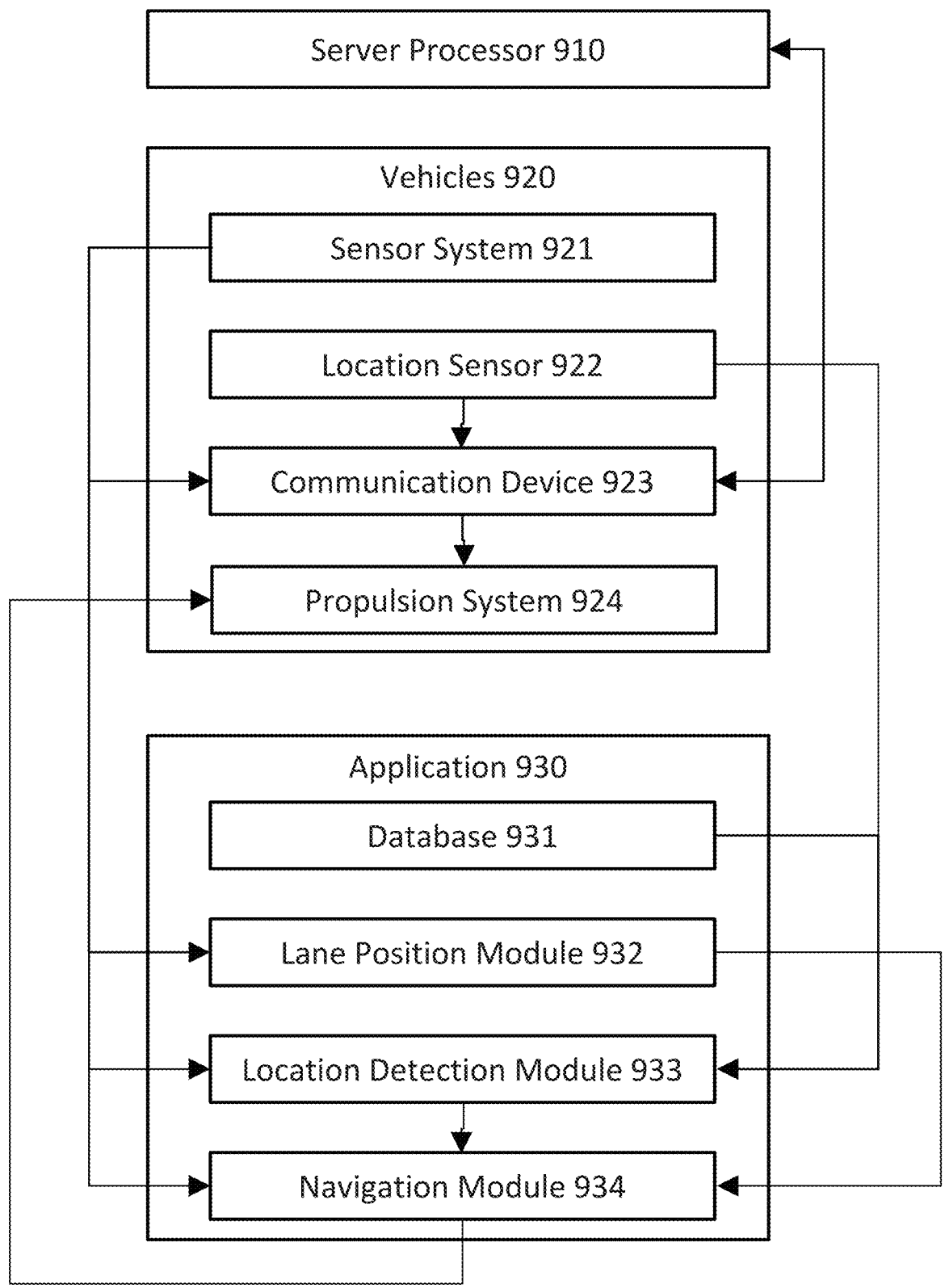
FIG. 9 is a flowchart of an exemplary system, in accordance with some embodiments.

Provided herein, per FIG. 9, is an system for navigation within a plurality of navigable pathways within an unstructured open environment. The system may comprise a server processor 910, an autonomous or semi-autonomous fleet, and a non-transitory computer-readable storage media encoded with a computer program including instructions executable by a processor to create an application 930.

The server processor 910 may be configured to provide a fleet management module application.

The autonomous or semi-autonomous fleet may comprise a plurality of autonomous or semi-autonomous vehicles 920. Each autonomous or semi-autonomous vehicle 920 may comprise: a sensor system 921, a location sensor 922, a communication device 923, and an autonomous or semi-autonomous propulsion system 924. The sensor system 921 may comprise a plurality of sensors. Each sensor may be configured to measure a sensed data. The location sensor 922 may be configured to measure a locational data. The sensor may comprise a camera, a video camera, a LiDAR, a RADAR, an ultrasonic sensor, a microphone, or any combination thereof. The location sensor 922 may comprise a GPS sensor, a compass, or any combination thereof.

The communication device 923 may be configured to receive a fleet instruction from the fleet management module application 930. The fleet instruction may comprise a route, a destination, a sensor activity, a driving parameter, a platooning parameter. At least one of the route and the destination may comprise a GPS coordinate, a map, a time, or any combination thereof. The driving parameter may comprise a maximum driving speed, a maximum acceleration, a minimum acceleration, a power usage parameter, or any combination thereof. The platooning parameter may comprise a drafting proximity, a drafting proximity adjustment speed, a drafting proximity adjustment acceleration, or any combination thereof. The communication device 923 may be further configured to transmit at least one of the sensed data and the location data to the fleet management module application 930.

In some embodiments, each of the autonomous or semi-autonomous vehicles 920 further comprises an energy storage device. The energy storage device may be configured to provide a power to at least one of the sensor system 921, the location sensor 922, the communication device 923, and the autonomous or semi-autonomous propulsion system 924. The energy storage device may comprise a battery, a capacitor, a supercapacitor, or any combination thereof. Each of the autonomous or semi-autonomous vehicles 920 may further an energy collection unit configured to collect a solar, wind, or thermal energy and transmit the collected energy to the energy storage device.

The application 930 may comprise a database 931, a lane position detection module 932, a location detection module 933, and a navigation module 934. The database 931 may comprise a map of the plurality of navigable pathways within the unstructured open environment. The map may comprise a plurality of GPS positions associated with a plurality of points within the navigable pathways. The map may comprise a navigable path lane center GPS coordinate, vector, or both. The map may further comprise a navigable path lane boundary GPS coordinate, vector, or both.

The lane position detection module 932 may determine a boundary of the navigable pathway. The boundary of the navigable pathway may comprise a lane boundary, a road boundary, a sidewalk, a partition, or any combination thereof. The lane position detection module 932 may determine the boundary of the navigable pathway based at least on the sensed data. The lane position detection module 932 may continually determine the boundary of the navigable pathway in real-time. In some embodiments, the boundary of the navigable pathway comprises a left boundary and a right boundary, and wherein the navigation module commands the autonomous or semi-autonomous propulsion system 924 to navigate between the left boundary and the right boundary. The location detection module 933 may determine a position of the autonomous or semi-autonomous vehicle 920. The location detection module 933 may determine the position of the autonomous or semi-autonomous vehicle 920 based at least on one or more of the map, the locational data, and the sensed data. The position may comprise a GPS position, a relative position, or any combination thereof. In some embodiments, the lane position detection module 932 and the location detection module 933 determine in parallel.

The navigation module 934 may command the autonomous or semi-autonomous propulsion system 924 to navigate within the plurality of navigable pathways. The navigation module 934 may command the autonomous or semi-autonomous propulsion system 924 to navigate within the plurality of navigable pathways based at least on one or more of the boundary of the navigable pathway, the position of the autonomous or semi-autonomous vehicle 920, the sensed data, and the fleet instruction. In some embodiments, the location detection module 933 confirms the position of the autonomous or semi-autonomous vehicle 920 based on the boundary of the navigable pathway and the map.

Figure 5:
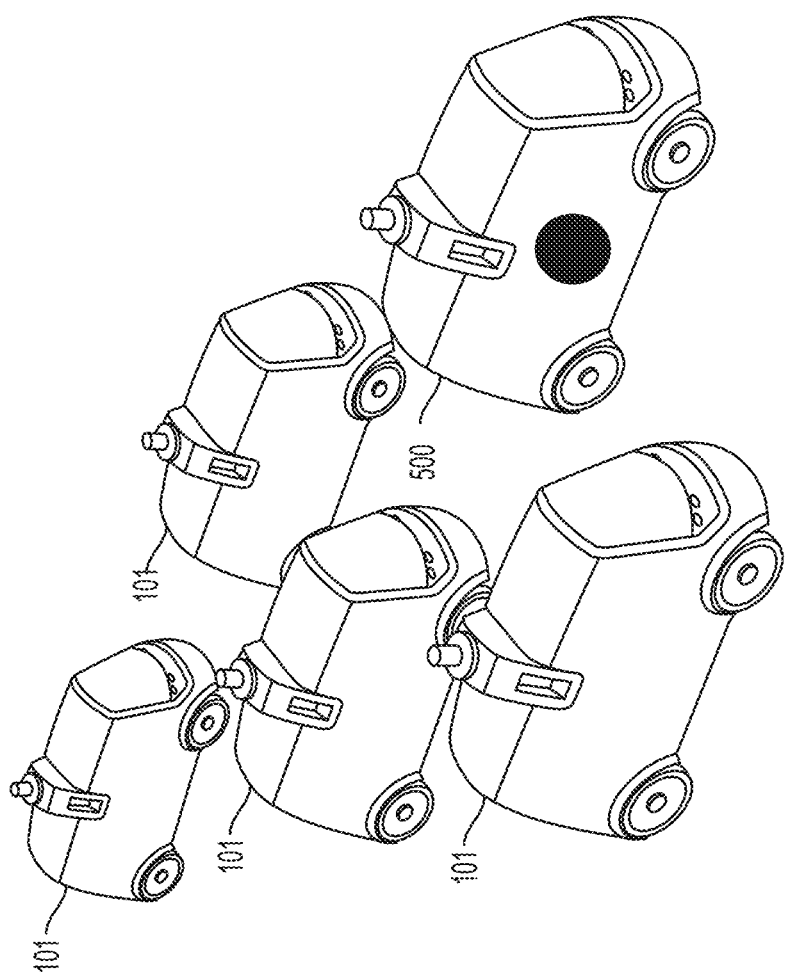
FIG. 5 is an illustration of an exemplary autonomous or semi-autonomous fleet comprising a lead autonomous or semi-autonomous vehicle, in accordance with some embodiments.

In some embodiments, at least one of the plurality of autonomous or semi-autonomous vehicles 920 in the autonomous or semi-autonomous fleet comprises a lead autonomous or semi-autonomous vehicle 920. In some embodiments, at three or more of the plurality of autonomous or semi-autonomous vehicles 920 form a hierarchy of lead autonomous or semi-autonomous vehicles 920. In some embodiments the hierarchy of lead autonomous or semi-autonomous vehicles 920 comprises a primary lead autonomous or semi-autonomous vehicle and a secondary lead autonomous or semi-autonomous vehicle. The primary lead autonomous or semi-autonomous vehicle 920 may lead the secondary lead autonomous or semi-autonomous vehicle 920, wherein the secondary lead autonomous or semi-autonomous vehicle 920 leads one or more autonomous or semi-autonomous vehicles 920. The lead autonomous or semi-autonomous vehicle 920 may be directed along a route or pathway determined or received by the server processor. The non-lead autonomous or semi-autonomous vehicles 920 may navigate solely or in part based on the location of the lead autonomous or semi-autonomous vehicle 920. FIG. 5 shows an exemplary diagram of a fleet of autonomous or semi-autonomous vehicles 101 comprising a lead vehicle 500.

In some embodiments, the application 930 further comprises a lead position detection module. In some embodiments, the lead position detection module determines a position, a velocity, or both, of the lead autonomous or semi-autonomous vehicle 920. In some embodiments, the lead position detection module determines a position, a velocity, or both, of the primary lead autonomous or semi-autonomous vehicle 920, the secondary lead autonomous or semi-autonomous vehicle 920, or both. In some embodiments, the lead position detection module determines a position, a velocity, or both, of the lead autonomous or semi-autonomous vehicle 920 based at least on one or more of the sensed data and the fleet instruction.

In some embodiments, the application 930 further comprises a platooning module. The platooning module may determine a drafting proximity adjustment. The platooning module may determine a drafting proximity adjustment based at least on the position, the velocity, or both, of the lead autonomous or semi-autonomous vehicle 920. The platooning module may determine a drafting proximity adjustment. The drafting proximity adjustment may comprise a vector from one autonomous or semi-autonomous vehicle 920 to the lead autonomous or semi-autonomous vehicle 920. The drafting proximity adjustment may additionally or alternatively comprise a velocity, a time, a distance, or any combination thereof necessary for one autonomous or semi-autonomous vehicle 920 to position itself with a set drafting proximity from the lead autonomous or semi-autonomous vehicle 920. The set drafting proximity may comprise a physical distance between the autonomous or semi-autonomous vehicle 920 and the lead autonomous or semi-autonomous vehicle 920 during transit. The set drafting proximity may be configured to enable drafting of one autonomous or semi-autonomous vehicle 920 behind the lead autonomous or semi-autonomous vehicle 920 in the direction of travel. The set drafting proximity may be dependent upon the velocity and/or the acceleration of the autonomous or semi-autonomous vehicle 920, the lead autonomous or semi-autonomous vehicle 920, or both. The set drafting proximity may be about 1 foot, about 2 feet, about 3 feet, about 4 feet, about 5 feet, about 6 feet, about 8 feet, about 10 feet, or any increment therein. The set drafting proximity may at least about 1 foot.

In some embodiments, the navigation module further commands the autonomous or semi-autonomous propulsion system 924 based on the drafting proximity adjustment. In some embodiments, the navigation module commands the autonomous or semi-autonomous propulsion system 924 based on the drafting proximity adjustment when the drafting proximity adjustment is within a set threshold. The set threshold may comprise a predetermined maximum distance between one autonomous or semi-autonomous vehicle 920 and the lead autonomous or semi-autonomous vehicle 920. The set threshold may further or alternatively comprise a predetermined maximum drafting proximity adjustment beyond which platooning is inefficient. For example, if the distance between the autonomous or semi-autonomous vehicle 920 and the lead autonomous or semi-autonomous vehicle 920 is 50 feet, the advantages associated with platooning may outweigh the costs associated with performing the drafting proximity adjustment. As another example, if the distance between the autonomous or semi-autonomous vehicle 920 and the lead autonomous or semi-autonomous vehicle 920 is 2 miles, the advantages associated with platooning may not outweigh the costs associated with performing the drafting proximity adjustment. The predetermined maximum distance may be about 30 feet, about 40 feet, about 50 feet, about 75 feet, about 100 feet, about 150 feet, about 200 feet, or any increment therein. The predetermined maximum distance may be at least about 20 feet. The predetermined maximum drafting proximity adjustment may comprise a velocity change of about 5 mph (miles per hour), 6 mph, 8 mph, 10 mph, 15 mph, 20 mph, 30 mph or any increment therein. The predetermined maximum drafting proximity adjustment may comprise a velocity change of at least about 5 mph.

In some embodiments, the application 930 further comprises a driving safety module. The driving safety module may detect a hazard based at least on the sensed data. The hazard may comprise at least one of a weather condition, a manned vehicle position, and an obstacle. In some embodiments, the driving safety module further determines a corrective maneuver. The corrective maneuver may comprise an acceleration, a deceleration, a stop, a turn, a reverse, or any combination thereof. In some embodiments, the driving safety module further determines a corrective maneuver based on the hazard. In some embodiments, the navigation module further commands the autonomous or semi-autonomous propulsion system 924 based on the corrective maneuver.

Figure 10:
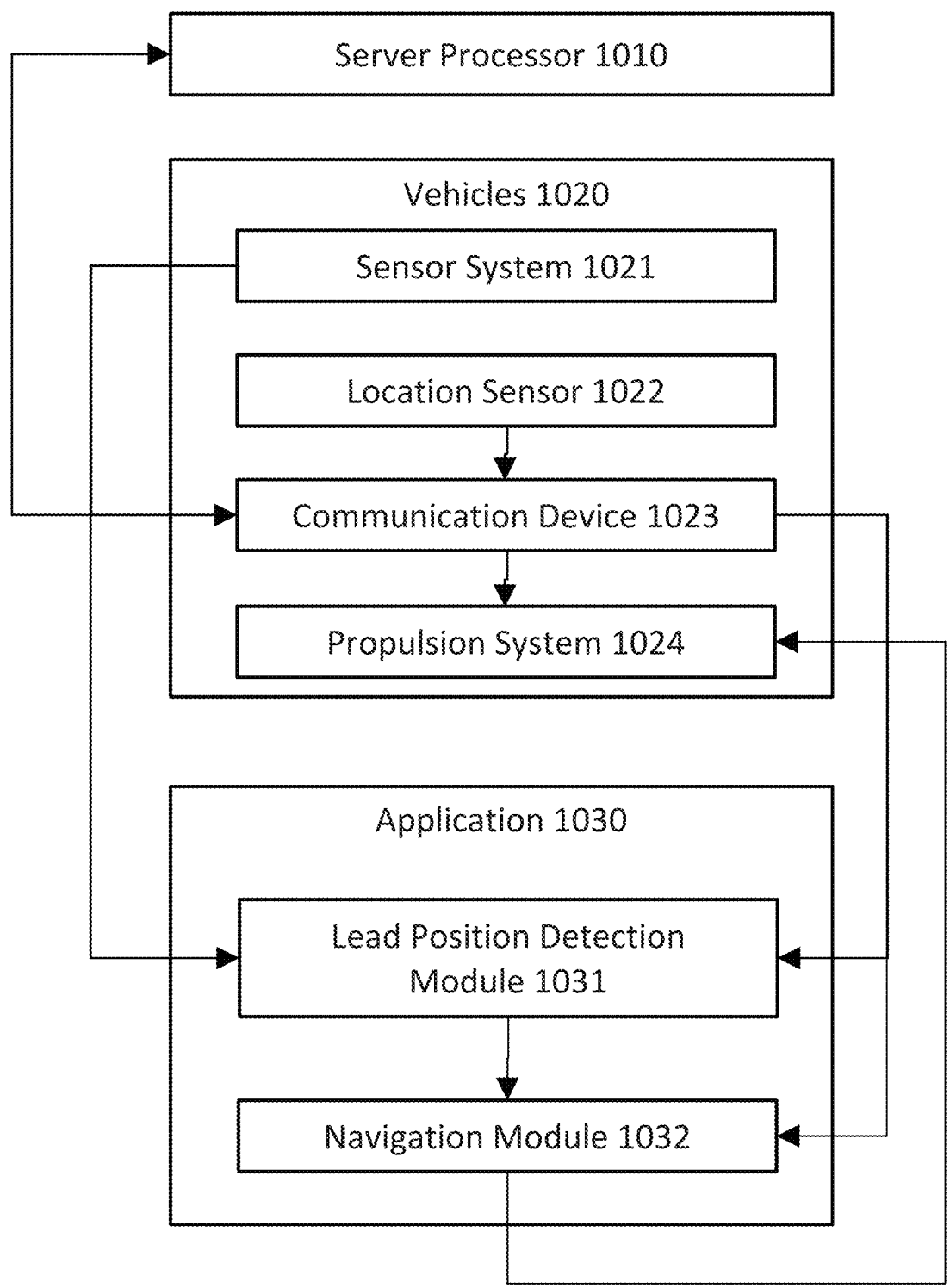
FIG. 10 is another flowchart of an exemplary system, in accordance with some embodiments.

Also provided herein, per FIG. 10, is an system for navigation within a plurality of navigable pathways within an unstructured open environment, the system comprising a server processor 1010, an autonomous or semi-autonomous fleet, and a non-transitory computer-readable storage media encoded with a computer program including instructions executable by a processor to create an application 1030.

The server processor 1010 may be configured to provide a fleet management module application 1030.

The autonomous or semi-autonomous fleet may comprise a plurality of autonomous or semi-autonomous vehicles 1020. At least one of the plurality of autonomous or semi-autonomous vehicles 1020 may comprise a lead autonomous or semi-autonomous vehicle. In some embodiments, at three or more of the plurality of autonomous or semi-autonomous vehicles 1020 form a hierarchy of lead autonomous or semi-autonomous vehicles 1020. In some embodiments the hierarchy of lead autonomous or semi-autonomous vehicles 1020 comprises a primary lead autonomous or semi-autonomous vehicle and a secondary lead autonomous or semi-autonomous vehicle. The primary lead autonomous or semi-autonomous vehicle 1020 may lead the secondary lead autonomous or semi-autonomous vehicle 1020, wherein the secondary lead autonomous or semi-autonomous vehicle 1020 leads one or more autonomous or semi-autonomous vehicles 1020. The lead autonomous or semi-autonomous vehicle 1020 may be directed along a route or pathway determined or received by the server processor. The non-lead autonomous or semi-autonomous vehicles 1020 may navigate solely or in part based on the location of the lead autonomous or semi-autonomous vehicle 1020.

Each autonomous or semi-autonomous vehicle 1020 may comprise a sensor system 1021, a location sensor 1022, a communication device 1023, and an autonomous or semi-autonomous propulsion system 1024. The sensor system 1021 may comprise a plurality of sensors. The sensors may be configured to measure a sensed data. The location sensor 1022 may be configured to measure a locational data. The sensor may comprise a camera, a video camera, a LiDAR, a RADAR, an ultrasonic sensor, a microphone, or any combination thereof. The location sensor 1022 may comprise a GPS sensor, a compass, or any combination thereof.

The communication device 1023 may be configured to receive a fleet instruction from the fleet management module application 1030. The fleet instruction may comprise a route, a destination, a sensor activity, a driving parameter, a platooning parameter. At least one of the route and the destination may comprise a GPS coordinate, a map, a time, or any combination thereof. The driving parameter may comprise a maximum driving speed, a maximum acceleration, a minimum acceleration, a power usage parameter, or any combination thereof. The platooning parameter may comprise a drafting proximity, a drafting proximity adjustment speed, a drafting proximity adjustment acceleration, or any combination thereof. The communication device 1023 may be further configured and to transmit the sensed data to the fleet management module application 1030. The location sensor 1022 may be configured to measure a locational data. The communication device 1023 may comprise a cellular communication device, a Bluetooth communication device, a Wi-Fi communication device, a wired communication device, or any combination thereof.

In some embodiments, each of the autonomous or semi-autonomous vehicles 1020 further comprises an energy storage device. The energy storage device may be configured to provide a power to at least one of the sensor system 1021, the location sensor 1022, the communication device 1023, and the autonomous or semi-autonomous propulsion system 1024. The energy storage device may comprise a battery, a capacitor, a supercapacitor, or any combination thereof. Each of the autonomous or semi-autonomous vehicles 1020 may further an energy collection unit configured to collect a solar, wind, or thermal energy and transmit the collected energy to the energy storage device.

The application 1030 may comprise a lead position detection module 1031 and a navigation module 1032. The lead position detection module 1031 may determine a position, a velocity, or both of the lead autonomous or semi-autonomous vehicle 1020. The lead position detection module 1031 may determine the position, the velocity, or both of the lead autonomous or semi-autonomous vehicle 1020 based at least on one or more of the sensed data and the fleet instruction. In some embodiments, the lead position detection module 1031 determines a position, a velocity, or both, of the primary lead autonomous or semi-autonomous vehicle 1020, the secondary lead autonomous or semi-autonomous vehicle 1020, or both. The navigation module 1032 may command the autonomous or semi-autonomous propulsion system 1024 to navigate within the plurality of navigable pathways. The navigation module 1032 may command the autonomous or semi-autonomous propulsion system 1024 to navigate within the plurality of navigable pathways based at least on one or more of the position of the lead autonomous or semi-autonomous vehicle, the velocity of the lead autonomous or semi-autonomous vehicle, the sensed data, and the fleet instruction.

In some embodiments, the application 1030 further comprises a platooning module. The platooning module may determine a drafting proximity adjustment. The platooning module may determine a drafting proximity adjustment based at least on the position, the velocity, or both, of the lead autonomous or semi-autonomous vehicle 1020. The platooning module may determine a drafting proximity adjustment. The drafting proximity adjustment may comprise a vector from one autonomous or semi-autonomous vehicle 1020 to the lead autonomous or semi-autonomous vehicle. The drafting proximity adjustment may additionally or alternatively comprise a velocity, a time, a distance, or any combination thereof necessary for one autonomous or semi-autonomous vehicle 1020 to position itself with a set drafting proximity from the lead autonomous or semi-autonomous vehicle 1020. The set drafting proximity may comprise a physical distance between the autonomous or semi-autonomous vehicle 1020 and the lead autonomous or semi-autonomous vehicle 1020 during transit. The set drafting proximity may be configured to enable drafting of one autonomous or semi-autonomous vehicle 1020 behind the lead autonomous or semi-autonomous vehicle 1020 in the direction of travel. The set drafting proximity may be dependent upon the velocity and/or the acceleration of the autonomous or semi-autonomous vehicle 1020, the lead autonomous or semi-autonomous vehicle 1020, or both. The set drafting proximity may be about 1 foot, about 2 feet, about 3 feet, about 4 feet, about 5 feet, about 6 feet, about 8 feet, about 10 feet, or any increment therein. The set drafting proximity may at least about 1 foot.

In some embodiments, the navigation module further commands the autonomous or semi-autonomous propulsion system 1024 based on the drafting proximity adjustment. In some embodiments, the navigation module commands the autonomous or semi-autonomous propulsion system 1024 based on the drafting proximity adjustment when the drafting proximity adjustment is within a set threshold. The set threshold may comprise a predetermined maximum distance between one autonomous or semi-autonomous vehicle 1020 and the lead autonomous or semi-autonomous vehicle 1020. The set threshold may further or alternatively comprise a predetermined maximum drafting proximity adjustment beyond which platooning is inefficient. For example, if the distance between the autonomous or semi-autonomous vehicle 1020 and the lead autonomous or semi-autonomous vehicle 1020 is 50 feet, the advantages associated with platooning may outweigh the costs associated with performing the drafting proximity adjustment. As another example, if the distance between the autonomous or semi-autonomous vehicle 1020 and the lead autonomous or semi-autonomous vehicle 1020 is 2 miles, the advantages associated with platooning may not outweigh the costs associated with performing the drafting proximity adjustment. The predetermined maximum distance may be about 30 feet, about 40 feet, about 50 feet, about 75 feet, about 100 feet, about 150 feet, about 200 feet, or any increment therein. The predetermined maximum distance may be at least about 20 feet. The predetermined maximum drafting proximity adjustment may comprise a velocity change of about 5 mph (miles per hour), 6 mph, 8 mph, 10 mph, 15 mph, 20 mph, 30 mph or any increment therein. The predetermined maximum drafting proximity adjustment may comprise a velocity change of at least about 5 mph.

In some embodiments, the application 1030 further comprises a driving safety module. The driving safety module may detect a hazard. The driving safety module may detect the hazard based at least on the sensed data. The hazard may comprise at least one of a weather condition, a manned vehicle position, and an obstacle. In some embodiments, the driving safety module further determines a corrective maneuver. The corrective maneuver may comprise an acceleration, a deceleration, a stop, a turn, a reverse, or any combination thereof. In some embodiments, the driving safety module further determines the corrective maneuver based on the hazard. In some embodiments, the navigation module 1032 further commands the autonomous or semi-autonomous propulsion system 1024. In some embodiments, the navigation module 1032 further commands the autonomous or semi-autonomous propulsion system 1024 based on the corrective maneuver.

Navigation Module

In some embodiments, the navigation system controls routing of the propulsion system of the vehicles in the fleet in the unstructured open environment.

Each vehicle in the fleet may comprise a navigation module for navigation in the unstructured open environment. In some embodiments, the fleet relies on maps generated by the user, operator or fleet operator, specifically created to cover the intended environment where the vehicle is configured to operate. These maps may then be used for general guidance of each vehicle in the fleet. Each vehicle in the fleet may augment this understanding of the environment by using a variety of on-board sensors such as cameras (still frame and video), LiDAR sensors, altimeters, depth finders or radar to confirm its relative geographic position, elevation and position of obstacles in its path or nearby surroundings.

In some embodiments, the vehicle or system employs internal maps to provide route, geographical and road structure information combined with information received from onboard sensors. Internal computers may process this data to constantly determine where the vehicle may safely navigate, and what other objects are around each vehicle. In still other embodiments, the fleet may incorporate on-line maps to augment internal maps. This information may then be combined to determine and execute a safe and robust vehicle trajectory. In some embodiments, the fleet relies on a global positioning system (GPS) to determine the exact location and velocity of the vehicles 24 hours a day.

In some embodiments, the fleet of vehicles may employ a combination of internal (digital) maps, sensors, and GPS systems to confirm its relative geographic position and elevation. In some embodiments, the fleet of vehicles may employ a combination of internal (digital) maps, sensors, GPS systems and any one or more of the internal visual sensors (e.g., still and video cameras [running at a high frame rate]) observed by a remote user, to confirm its relative geographic position and elevation.

In some embodiments, the autonomous fleet is strategically positioned throughout a geographic region in anticipation of a known demand. Over time, a user and/or a vendor may anticipate demand for vehicle services by storing data concerning how many orders, and what type of orders, are made at particular times of day from different areas of the region. This may be done for both source (e.g., client lists, general businesses, etc.) and destination (e.g., construction sites, urban development plans, etc.). Then, for a specific month, week, day, or time, this stored data may be used to determine the optimal location of the fleet given the expected demand. The fleet may be positioned to be as close as possible to the expected source locations, anticipating these source locations may be the most likely new orders to come into the system. In some embodiments, the positioning of vehicles may be customized based on: anticipated use, a pattern of historical behaviors, or vehicle configurations with specific sensor packages.

Propulsion Systems

Each vehicle in the fleet may comprise a propulsion system (e.g., a drive system with a propulsion engine, wheels, treads, wings, rotors, blowers, rockets, propellers, brakes, etc.).

The fleet may be configured for land, water, or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and unmanned spacecraft.

In one exemplary embodiment, the land vehicle is configured with a traditional 4-wheeled automotive configuration comprising steering and braking systems. The drive train may comprise a 2-wheel drive or a 4-wheel drive. The propulsion system (engine) may be a gas engine, a turbine engine, an electric motor, a hybrid gas/electric engine, or any combination thereof. Alternatively, the vehicle may be configured with an auxiliary solar power system to provide back-up emergency power or power for minor low-power sub-systems. Alternative or additional propulsion systems may comprise wheels, treads, wings, rotors, blowers, rockets, propellers, brakes, or any combination thereof.

In some embodiments, the fleet is configured for water travel as a watercraft with a propulsion system (engine) that is configured as a gas engine, a turbine engine, an electric motor, and/or a hybrid gas/electric engine and is further configured with a propeller. In some embodiments, when the vehicle is configured for water travel, it is further configured to monitor, collect, and report data, (e.g., water sample analysis). For example, the fleet is configured to monitor and report conditions in public waterways, canals, dams, and lakes. Alternately the fleet is configured to monitor and report conditions in flood disaster areas. In some embodiments, the fleet is configured for hover travel as an over-land or over-water hovercraft, also sometimes referred to as an air-cushion vehicle (ACV) and is configured with blowers to produce a large volume of air below the hull that is slightly above atmospheric pressure. The propulsion system (engine) is configured as a gas engine, a turbine engine, an electric motor, and/or a hybrid gas/electric engine. In some embodiments, the fleet is configured for air travel as an aerial drone or aerial hovercraft and is configured with wings, rotors, blowers, rockets, and/or propellers and an appropriate brake system. The propulsion system (engine) is configured as a gas engine, a turbine engine, an electric motor, and/or a hybrid gas/electric engine. In some embodiments, each vehicle of the fleet is configured with one or more power sources, which comprise the power system (e.g., battery, solar, gasoline, propane, hybrid, etc.).

Sensor Systems

Each vehicle may be equipped with a sensor system, comprising a plurality of sensors comprising a still camera, a video camera (which may run at a high frame rate0, a LiDAR, a radar, an ultrasonic sensor, a microphone, an altimeter, a depth finder, a laser range finder, or any combination thereof. An internal computer may process the sensed data collected by the sensor system to constantly determine safe navigation paths and to detect surrounding objects, what other objects are around each vehicle and what it may do within its immediate surroundings.

In some embodiments, each vehicle is equipped with a sensor system comprising a plurality of sensors configured to assess the environment around the vehicle; (e.g., temperature sensors, humidity sensors, rainfall sensors, wind sensors, UV sensors, etc.).

In some embodiments, each autonomous or semi-autonomous vehicle within the fleet is equipped with a sensor system comprising plurality of sensors configured to assess a variety of different environmental conditions around the vehicle. Those conditions comprise: lighting, weather and atmospheric conditions; vehicle traffic; pedestrian traffic; moving and stationary obstacles; navigable pathway, waterway or airway conditions; road signage, traffic lights and power utilities, general road conditions, to name but a few.

In some embodiments, the vehicles of the fleet further comprise propulsion system sensors configured to: monitor drive mechanism performance (e.g., the propulsion engine); monitor power system levels (e.g., battery, solar, fuel, etc.); or monitor drive train performance (e.g., transmission, tires, treads, brakes, rotors, jets, blowers, propellers, etc.).

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 11:
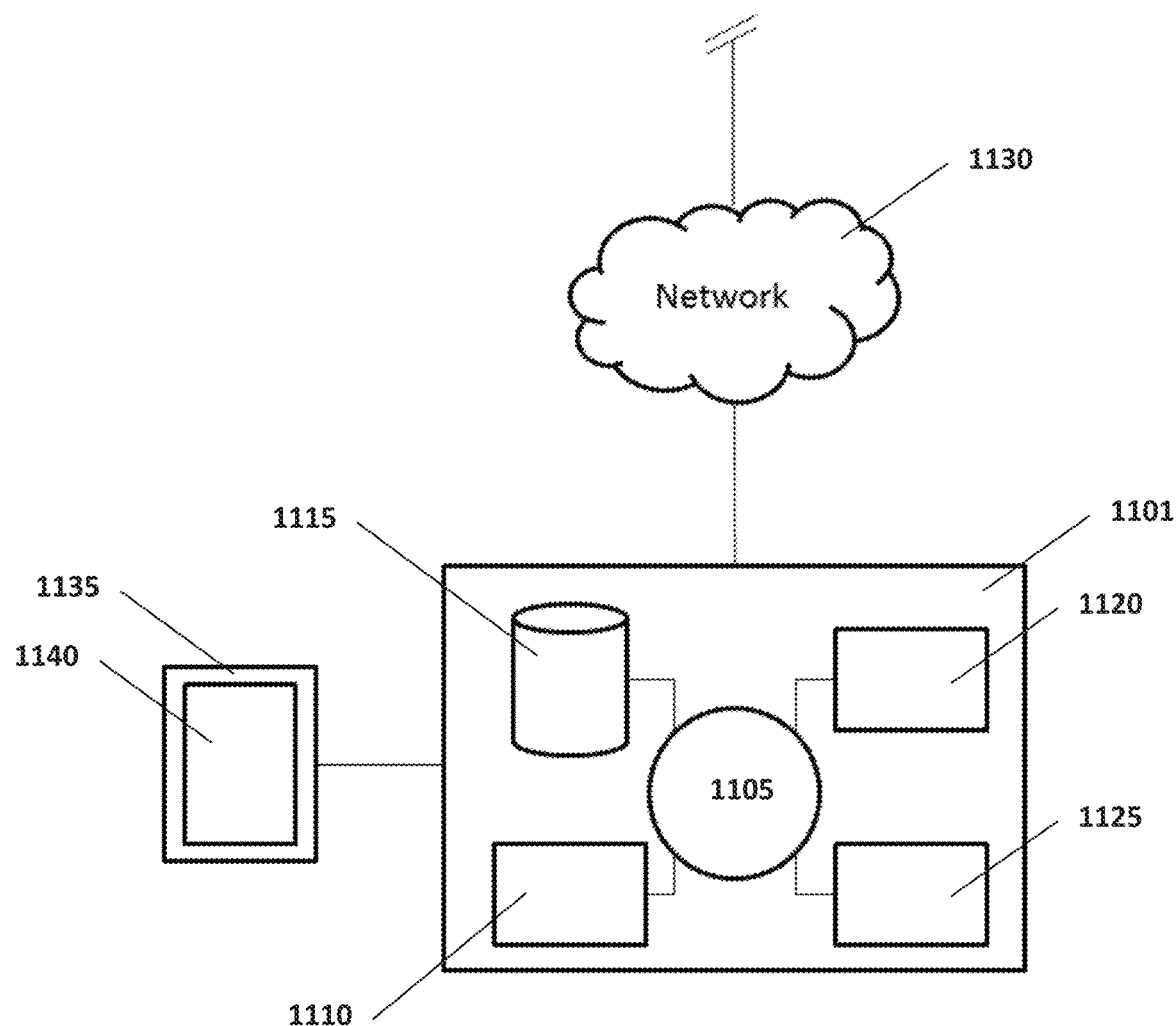
FIG. 11 is a non-limiting schematic diagram of a digital processing device; in this case, a device with one or more CPUs, a memory, a communication interface, and a display, in accordance with some embodiments.

Referring to FIG. 11, in a particular embodiment, a digital processing device 1101 is programmed or otherwise configured to provide an system for navigation within a plurality of navigable pathways within an unstructured open environment. The device 1101 may be programmed or otherwise configured to provide an system for navigation within a plurality of navigable pathways within an unstructured open environment. In this embodiment, the digital processing device 1101 includes a central processing unit (CPU, also "processor" and "computer processor" herein) 1105, which is optionally a single core, a multi core processor, or a plurality of processors for parallel processing. The digital processing device 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 comprises a data storage unit (or data repository) for storing data. The digital processing device 1101 is optionally operatively coupled to a computer network ("network") 1130 with the aid of the communication interface 1120. The network 1130, in various cases, is the internet, an internet, and/or extranet, or an intranet and/or extranet that is in communication with the internet. The network 1130, in some cases, is a telecommunication and/or data network. The network 1130 optionally includes one or more computer servers, which enable distributed computing, such as cloud computing. The network 1130, in some cases, with the aid of the device 1101, implements a peer-to-peer network, which enables devices coupled to the device 1101 to behave as a client or a server.

Continuing to refer to FIG. 11, the CPU 1105 is configured to execute a sequence of machine-readable instructions, embodied in a program, application, and/or software. The instructions are optionally stored in a memory location, such as the memory 1110. The instructions are directed to the CPU 105, which subsequently program or otherwise configure the CPU 1105 to implement methods of the present disclosure. Examples of operations performed by the CPU 1105 include fetch, decode, execute, and write back. The CPU 1105 is, in some cases, part of a circuit, such as an integrated circuit. One or more other components of the device 1101 are optionally included in the circuit. In some cases, the circuit is an application specific integrated circuit (ASIC) or a field programmable gate array (FPGA).

Continuing to refer to FIG. 11, the storage unit 1115 optionally stores files, such as drivers, libraries and saved programs. The storage unit 1115 optionally stores user data, e.g., user preferences and user programs. The digital processing device 1101, in some cases, includes one or more additional data storage units that are external, such as located on a remote server that is in communication through an intranet or the internet.

Continuing to refer to FIG. 11, the digital processing device 1101 optionally communicates with one or more remote computer systems through the network 1130. For instance, the device 1101 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 101, such as, for example, on the memory 1110 or electronic storage unit 1115. The machine executable or machine readable code is optionally provided in the form of software. During use, the code is executed by the processor 1105. In some cases, the code is retrieved from the storage unit 1115 and stored on the memory 1110 for ready access by the processor 1105. In some situations, the electronic storage unit 1115 is precluded, and machine-executable instructions are stored on the memory 1110.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 12:
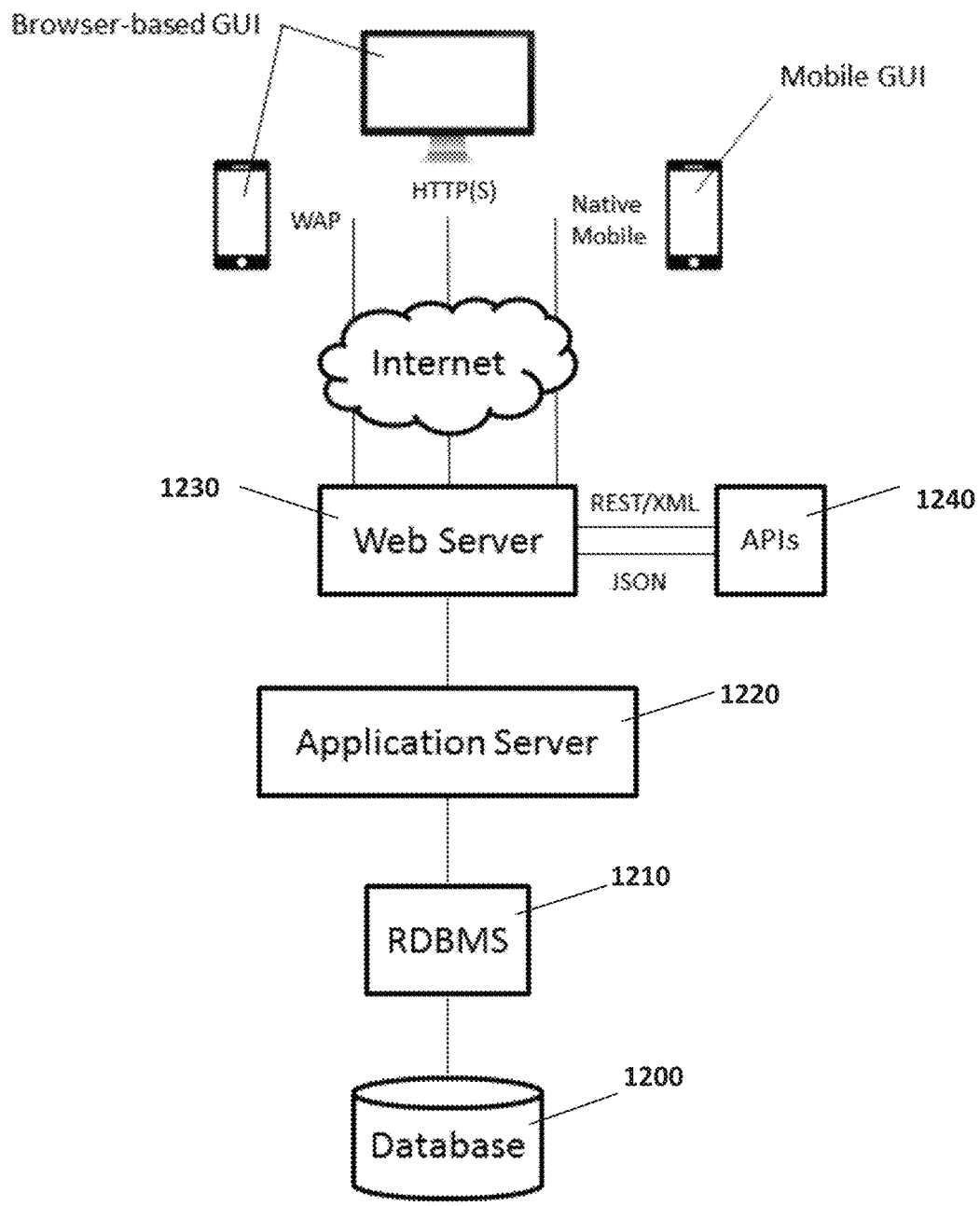
FIG. 12 is a non-limiting schematic diagram of a web/mobile application provision system; in this case, a system providing browser-based and/or native mobile user interfaces, in accordance with some embodiments.

Referring to FIG. 12, in a particular embodiment, an application provision system comprises one or more databases 1200 accessed by a relational database management system (RDBMS) 1210. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1220 (such as Java servers, .NET servers, PHP servers, and the like) and one or more web servers 1230 (such as Apache, IIS, GWS and the like). The web server(s) optionally expose one or more web services via app application programming interfaces (APIs) 1240. The system provides browser-based and/or mobile native user interfaces via a network, such as the internet.

Figure 13:
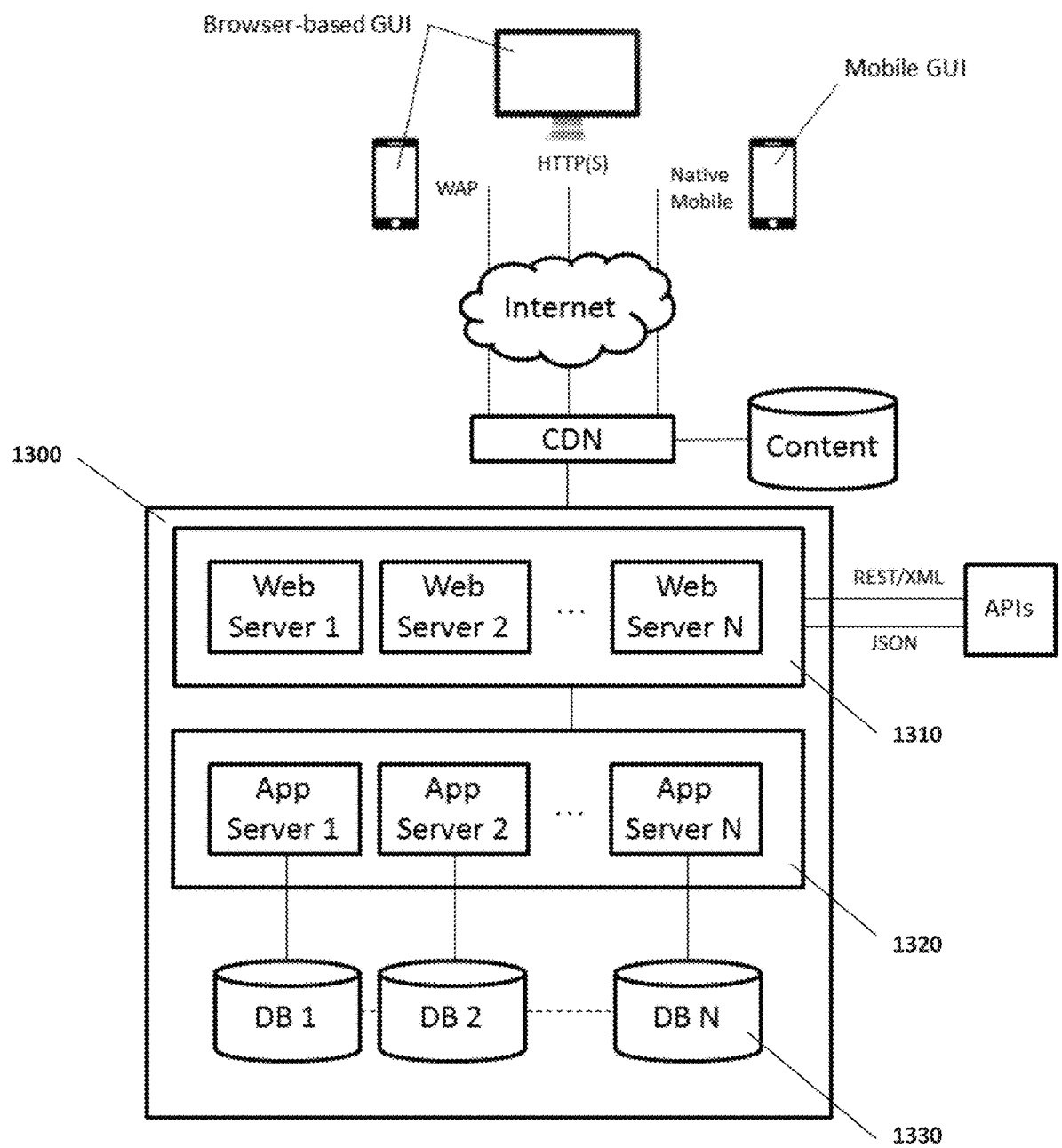
FIG. 13 is a non-limiting schematic diagram of a cloud-based web/mobile application provision system; in this case, a system comprising an elastically load balanced, auto-scaling web server and application server resources as well synchronously replicated databases, in accordance with some embodiments.

Referring to FIG. 13, in a particular embodiment, an application provision system alternatively has a distributed, cloud-based architecture 1300 and comprises elastically load balanced, auto-scaling web server resources 1310 and application server resources 1320 as well synchronously replicated databases 1330.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable to provide an system for navigation within a plurality of navigable pathways within an unstructured open environment. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Terms and Definitions

As used herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As used herein, the term "fleet," "sub-fleet," and like terms are used to indicate a number of land vehicles, watercraft, aircraft or the like, operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "vehicle," "vehicle," "fleet," "vehicle," "all-terrain vehicle," and like terms are used to indicate a mobile machine that transports cargo. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "platoon" or "platooning" and like terms are used to indicate or refer to a behavior exhibited by a vehicle, wherein the vehicle relies on the vehicle in front of it to be traveling in a safe, smart path that may be copied and followed. In this behavior, the lead vehicle acts as an early warning to both the vehicle and other road users (e.g., pedestrians, other drivers, etc.), thus limiting the exposure of the vehicle and reducing the potential for the vehicle being in a collision.

As used herein, the terms "platooning," "convoying," and like terms, are used to indicate or refer to a grouping of vehicles (such as a vehicle and a car, truck, van, motorcycle, or bicycle, etc.) traveling in close proximity to one another on roads or pathways. This capacity would allow many vehicles to accelerate or brake simultaneously and provide for closer headway between vehicles. This behavior may have many benefits including fuel economy due to reduced air resistance, reduced traffic congestion, added safety, and benefit of collision avoidance for the trailing vehicles.

As used herein, the terms "slipstreaming," "drafting," and like terms, are used to indicate a condition wherein an area of reduced pressure or "forward suction" is produced by and immediately following a fast-moving lead vehicle, thus allowing a close-following trailing vehicle to conserve energy while travelling at the same speed. An added benefit of this behavior occurs when an object is inside the slipstream behind another object, moving at the same speed, the rear object will require less power to maintain its speed than if it were moving independently. In addition, the leading object will be able to move faster than it could independently, because the rear object reduces the effect of the low-pressure region on the leading object. A slipstream is commonly defined as a region behind a moving object in which a wake of fluid (typically air or water) is moving at velocities comparable to the moving object, relative to the ambient fluid through which the object is moving. The term slipstream also applies to the similar region adjacent to an object with a fluid moving around it. "Slipstreaming" works because of the relative motion of the fluid in the slipstream.

As used herein, the term "user," "operator," "fleet operator," and like terms are used to indicate the entity that owns or is responsible for managing and operating the fleet.

As used herein, the term "customer" and like terms are used to indicate the entity that requests the services provided the fleet.

As used herein, the term "provider," "business," "vendor," "third-party vendor," and like terms are used to indicate an entity that works in concert with the fleet owner or operator to utilize the services of the fleet to deliver the provider's product from and or return the provider's product to the provider's place of business or staging location.

As used herein, the term "white label," "white label product," "white label services," "white label provider," and like terms shall refer to a product, or service produced by one company (the producer) that other companies (the marketers) rebrand to make it appear as if they had made it.

As used herein, the term "maximum speed," "maximum speed range," and like terms shall refer to maximum speeds of which the vehicle is capable of generating, and permitted, to operate within the tasked environment, such as: on open roads, bike paths, and other environments where higher speeds are appropriate.

As used herein, the term "operating speed" and like terms shall refer to a full range of speeds within which the vehicle is capable of operating, (including a full stop, or zero speed), as determined by the on-board sensors and software which may monitor environmental conditions, the operating environment, etc. to determine an appropriate speed at any given time.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees, 0.08 degrees, 0.07 degrees, 0.06 degrees, 0.05 degrees, 0.04 degrees, 0.03 degrees, 0.02 degrees or 0.01 degrees of a given value or range. In certain embodiments, the term "about" or "approximately" means within 0.1 mph, 0.2 mph, 0.3 mph, 0.4 mph, 0.5 mph, 0.6 mph, 0.7 mph, 0.8 mph, 0.9 mph, 1.0 mph, 1.1 mph, 1.2 mph, 1.3 mph, 1.4 mph, 1.5 mph, 1.6 mph, 1.7 mph, 1.8 mph, 1.9 mph, 2.0 mph, 3.0 mph, 4.0 mph or 5.0 mph of a given value or range.

As used herein, the term "server," "computer server," "central server," "main server," and like terms are used to indicate a computer or device on a network that manages the fleet resources, namely the vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the vehicle such as the securable compartments.

As used herein a "mesh network" is a network topology in which each node relays data for the network. All mesh nodes cooperate in the distribution of data in the network. It may be applied to both wired and wireless networks. Wireless mesh networks may be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs may take any form of network topology. Mesh networks may relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept may also apply to wired networks and to software interaction. A mesh network whose nodes are all connected to each other is a fully connected network.

As used herein, the term "module" and like terms are used to indicate a self-contained hardware component of the central server, which in turn comprises software modules. In software, a module is a part of a program. Programs are composed of one or more independently developed modules that are not combined until the program is linked. A single module may contain one or several routines, or sections of programs that perform a particular task. As used herein, the terms "module" and "algorithm" and like terms are also used to indicate a part of a program. Programs are composed of one or more independently developed modules and/or algorithms. A single module may contain one or several routines or algorithms. As used herein the fleet management module comprises software modules and/or algorithms for managing various aspects and functions of the fleet.

As used herein, the term "autonomous" may refer to an ability to perform one or more processes without direct intervention. The intervention may be by a human, or by a commanding processor. They one or more processes may include driving, obstacle avoidance, navigation, vehicle status determination, or any combination thereof. An autonomous system or vehicle may be configured to be overridden or halted by a human user or system manager.

As used herein, the term "semi-autonomous" may refer to an ability to perform one or more processes without direct intervention, while one or more additional processes require manual intervention. The intervention may be by a human, or by a commanding processor. They one or more processes may include driving, obstacle avoidance, navigation, vehicle status determination, or any combination thereof.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for navigation within a plurality of navigable pathways within an unstructured open environment, the system comprising:
   a) a server processor configured to provide a fleet management module application;
   b) an autonomous or semi-autonomous fleet comprising a plurality of autonomous or semi-autonomous vehicles, the plurality of autonomous or semi-autonomous vehicles including a lead autonomous or semi-autonomous vehicle, each autonomous or semi-autonomous vehicle comprising
- (i) a sensor system comprising a plurality of sensors configured to measure a sensed data,
- (ii) a location sensor configured to measure a locational data,
- (iii) a communication device configured to receive a fleet instruction from the fleet management module application, and to transmit at least one of the sensed data and the locational data to the fleet management module application, and
- (iv) an autonomous or semi-autonomous propulsion system; and c) the system further comprising a non-transitory computer-readable storage media encoded with a computer program including instructions executable by a processor to create an application comprising
- (i) a database comprising a map of the plurality of navigable pathways within the unstructured open environment,
- (ii) a lane position detection module determining a boundary of the navigable pathway based at least on the sensed data,
- (iii) a location detection module determining a position of the autonomous or semi-autonomous vehicle based at least on one or more of the map, the locational data, and the sensed data,
- (iv) a navigation module commanding the autonomous or semi-autonomous propulsion system to navigate within the plurality of navigable pathways based at least on one or more of the boundary of the navigable pathway, the position of the autonomous or semi-autonomous vehicle, the sensed data, and the fleet instruction, and
- (v) a platooning module determining a drafting proximity adjustment based at least on a position, a velocity, or both, of the lead autonomous or semi-autonomous vehicle, wherein the navigation module further commands the autonomous or semi-autonomous propulsion system based on the drafting proximity adjustment when the drafting proximity adjustment is within a set threshold.

2. The system of claim 1, wherein the application further comprises a lead position detection module determining the position, the velocity, or both, of the lead autonomous or semi-autonomous vehicle, based at least on one or more of the sensed data and the fleet instruction.

3. The system of claim 1, wherein the application further comprises a driving safety module detecting a hazard based at least on the sensed data, wherein the hazard comprises at least one of a weather condition, a manned vehicle position, and an obstacle.

4. The system of claim 3, wherein the driving safety module further determines a corrective maneuver based on the hazard.

5. The system of claim 4, wherein the navigation module further commands the autonomous or semi-autonomous propulsion system based on the corrective maneuver.

6. The system of claim 1, wherein the boundary of the navigable pathway comprises a left boundary and a right boundary, and wherein the navigation module commands the autonomous or semi-autonomous propulsion system to navigate between the left boundary and the right boundary.

7. The system of claim 1, wherein each of the autonomous or semi-autonomous vehicles further comprises an energy storage device configured to provide a power to at least one of the sensor system, the location sensor, the communication device, and the autonomous or semi-autonomous propulsion system.

8. The system of claim 1, wherein the lane position detection module and the location detection module determine in parallel.

9. The system of claim 1, wherein the location detection module confirms the position of the autonomous or semi-autonomous vehicle based on the boundary of the navigable pathway and the map.

10. A system for navigation within a plurality of navigable pathways within an unstructured open environment, the system comprising:

a) a server processor configured to provide a fleet management module application;

b) an autonomous or semi-autonomous fleet comprising a plurality of autonomous or semi-autonomous vehicles, wherein at least one of the plurality of autonomous or semi-autonomous vehicles comprises a lead autonomous or semi-autonomous vehicle; and wherein each autonomous or semi-autonomous vehicle comprises
- (i) a sensor system comprising a plurality of sensors configured to measure a sensed data,
- (ii) a communication device configured to receive a fleet instruction from the fleet management module application, and to transmit the sensed data to the fleet management module application,
- (iii) an autonomous or semi-autonomous propulsion system, and
- (iv) a location sensor configured to measure a locational data; and c) the system further comprising a non-transitory computer-readable storage media encoded with a computer program including instructions executable by a processor to create an application comprising
- (i) a database comprising a map of the plurality of navigable pathways within the unstructured open environment,
- (ii) a lead position detection module determining a position, a velocity, or both of the lead autonomous or semi-autonomous vehicle based at least on one or more of the sensed data and the fleet instruction,
- (iii) a navigation module commanding the autonomous or semi-autonomous propulsion system to navigate within the plurality of navigable pathways based at least on one or more of the position of the lead autonomous or semi-autonomous vehicle, the velocity of the lead autonomous or semi-autonomous vehicle, the sensed data, and the fleet instruction, wherein the navigation module further commands the autonomous or semi-autonomous propulsion system based on the drafting proximity adjustment, and wherein the navigation module commands the autonomous or semi-autonomous propulsion system based on the drafting proximity adjustment when the drafting proximity adjustment is within a set threshold, the set threshold being one selected from a group including a maximum distance between the lead autonomous or semi-autonomous vehicle and a following autonomous or semi-autonomous vehicle of the plurality of autonomous or semi-autonomous vehicles, and a maximum drafting proximity adjustment, and
- (iv) a platooning module determining a drafting proximity adjustment based at least on the position, the velocity, or both, of the lead autonomous or semi-autonomous vehicle.

11. The system of claim 10, wherein the application further comprises a driving safety module detecting a hazard based at least on the sensed data, wherein the hazard comprises at least one of a weather condition, a manned vehicle position, and an obstacle.

12. The system of claim 11, wherein the driving safety module further determines a corrective maneuver based on the hazard.

13. The system of claim 12, wherein the corrective maneuver is one selected from a group including an acceleration and a deceleration, and wherein the navigation module further commands the autonomous or semi-autonomous propulsion system based on the corrective maneuver.

14. A system for navigation within a plurality of navigable pathways within an unstructured open environment, the system comprising:
  a) a server processor configured to provide a fleet management module application;
  b) an autonomous or semi-autonomous fleet comprising a plurality of autonomous or semi-autonomous vehicles, each autonomous or semi-autonomous vehicle comprising
     (i) a sensor system comprising a plurality of sensors configured to measure a sensed data,
     (ii) a location sensor configured to measure a locational data,
     (iii) a communication device configured to receive a fleet instruction from the fleet management module application, and to transmit at least one of the sensed data and the locational data to the fleet management module application, the fleet instruction including a driving parameter and a platooning parameter, wherein the driving parameter includes at least one parameter selected from a group including a maximum driving speed, a maximum acceleration, and a minimum acceleration, and wherein the platooning parameter includes at least one parameter selected from a group including a drafting proximity, a drafting proximity adjustment speed, and a drafting proximity adjusting acceleration, and
     (iv) an autonomous or semi-autonomous propulsion system; and
  c) the system further comprising a non-transitory computer-readable storage media encoded with a computer program including instructions executable by a processor to create an application comprising
     (i) a database comprising a map of the plurality of navigable pathways within the unstructured open environment,
     (ii) a lane position detection module determining a boundary of the navigable pathway based at least on the sensed data,
     (iii) a location detection module determining a position of the autonomous or semi-autonomous vehicle based at least on one or more of the map, the locational data, and the sensed data, and
     (iv) a navigation module commanding the autonomous or semi-autonomous propulsion system to navigate within the plurality of navigable pathways based at least on one or more of the boundary of the navigable pathway, the position of the autonomous or semi-autonomous vehicle, the sensed data, and the fleet instruction.

15. The system of claim 14, wherein the lane position detection module and the location detection module determine in parallel.

16. The system of claim 14, wherein the location detection module confirms the position of the autonomous or semi-autonomous vehicle based on the boundary of the navigable pathway and the map.

* * * * *